Figure 1:
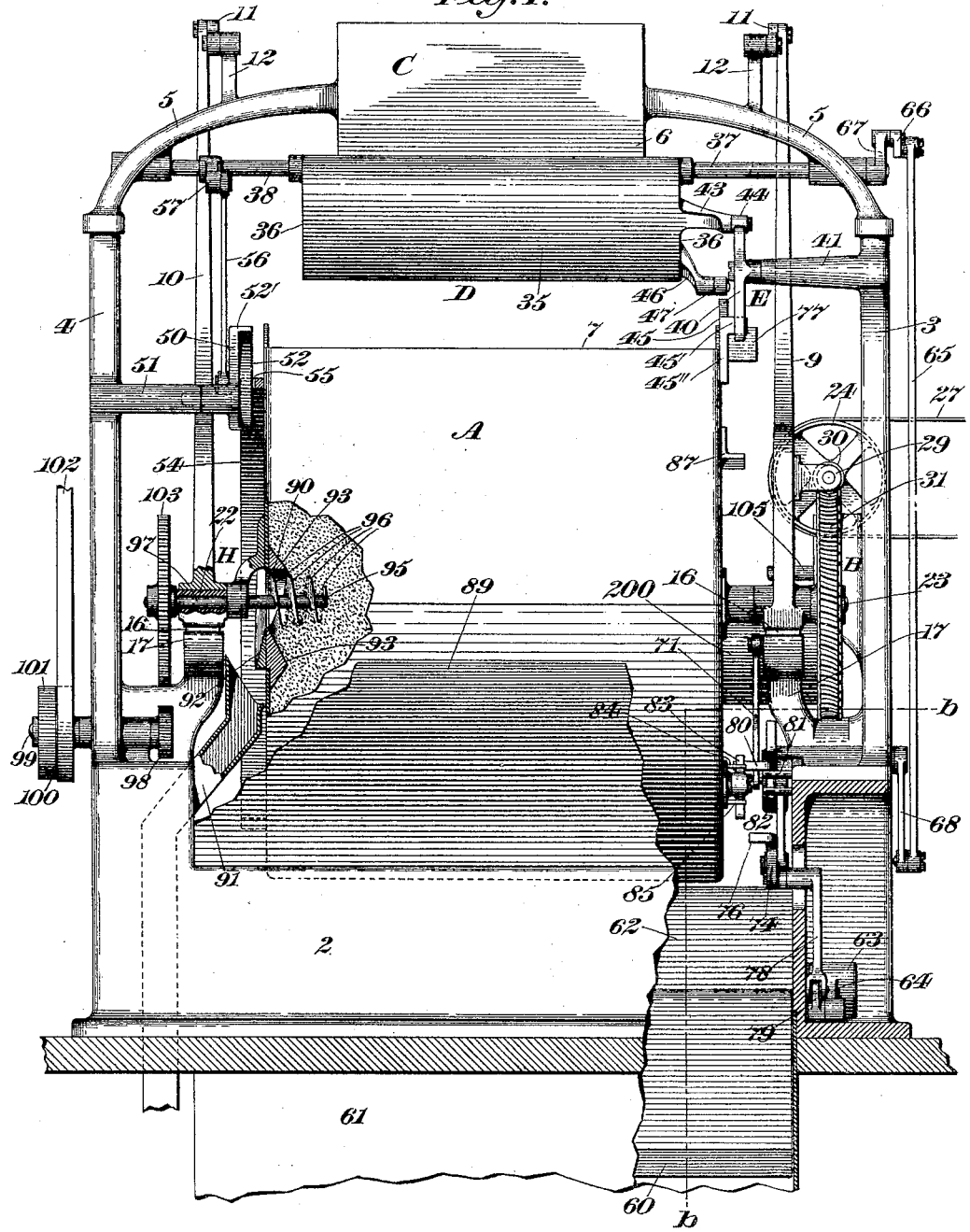

No. 607,458. Patented July 19, 1898.
F. H. RICHARDS.
WEIGHING MACHINE.
(Application filed Feb. 6, 1897.)
(No Model.) 8 Sheets—Sheet 1.

Witnesses:
C. W. Smith
Fred. J. Dole.

Inventor,
F. H. Richards.

No. 607,458. Patented July 19, 1898.
F. H. RICHARDS.
WEIGHING MACHINE.
(Application filed Feb. 6, 1897.)

(No Model.) 8 Sheets—Sheet 2.

Witnesses:
O. W. Smith
Fred J. Dole

Inventor:
F. H. Richards

No. 607,458. Patented July 19, 1898.
F. H. RICHARDS.
WEIGHING MACHINE.
(Application filed Feb. 6, 1897.)
(No Model.) 8 Sheets—Sheet 3.

No. 607,458. Patented July 19, 1898.
F. H. RICHARDS.
WEIGHING MACHINE.
(Application filed Feb. 6, 1897.)
(No Model.) 8 Sheets—Sheet 4.

Witnesses;
O. W. Smith
Fred. J. Dole,

Inventor;
F. H. Richards.

No. 607,458. Patented July 19, 1898.
F. H. RICHARDS.
WEIGHING MACHINE.
(Application filed Feb. 6, 1897.)
(No Model.) 8 Sheets—Sheet 6.

Witnesses:
O. W. Smith
Fred. J. Dole.

Inventor:
F. H. Richards.

No. 607,458. Patented July 19, 1898.
F. H. RICHARDS.
WEIGHING MACHINE.
(Application filed Feb. 6, 1897.)
(No Model.) 8 Sheets—Sheet 7.
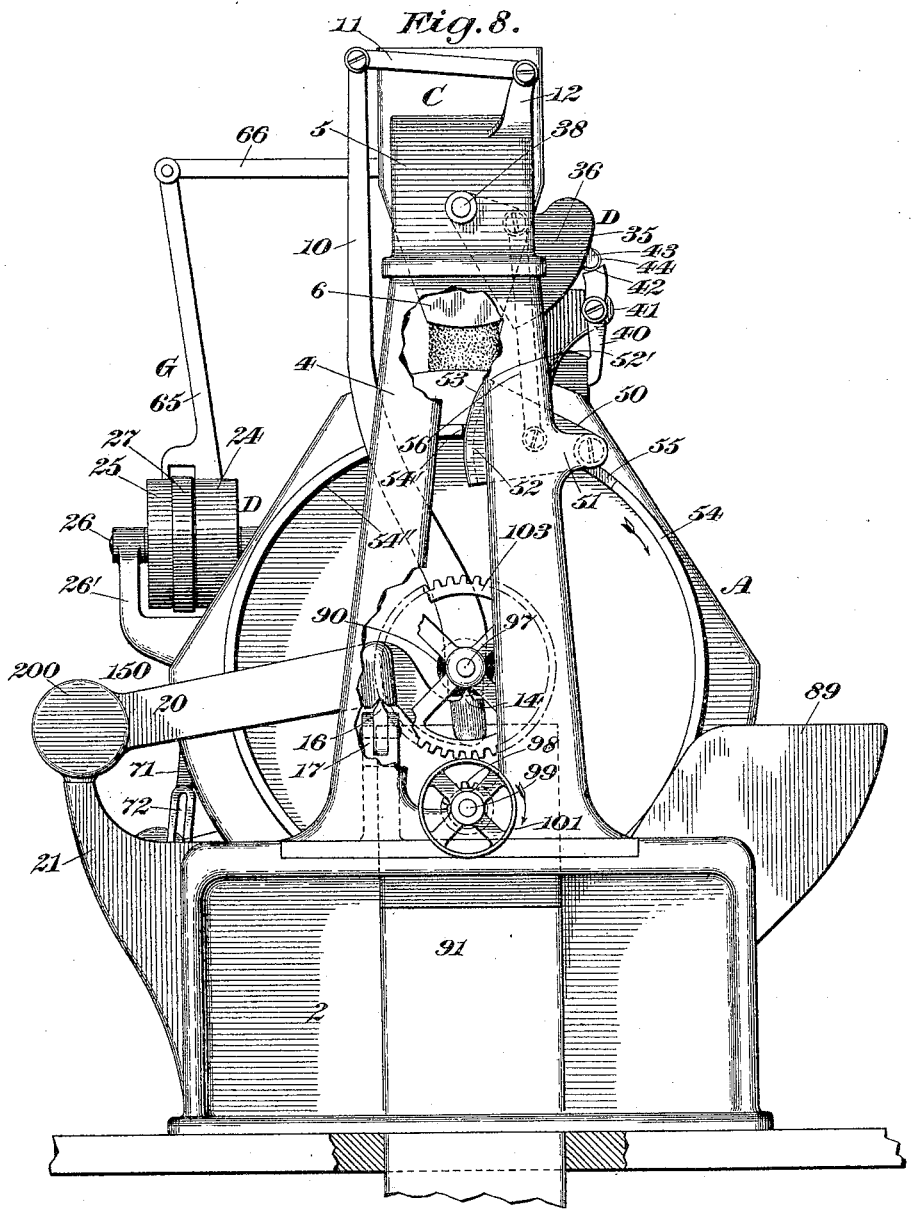
Witnesses:
O. W. Smith
Fred. J. Dole.
Inventor:
F. H. Richards

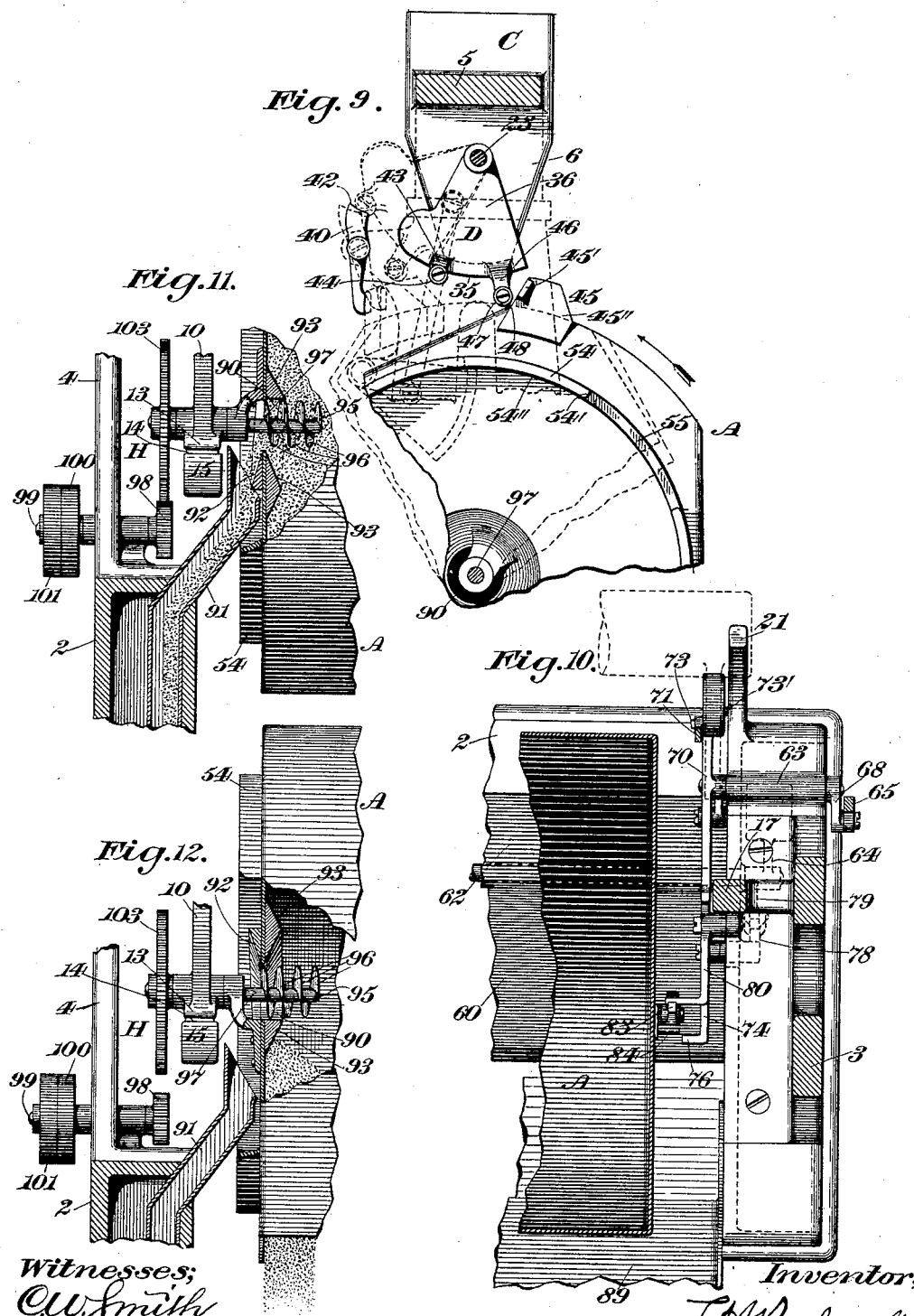

UNITED STATES PATENT OFFICE.

FRANCIS H. RICHARDS, OF HARTFORD, CONNECTICUT.

WEIGHING-MACHINE.

SPECIFICATION forming part of Letters Patent No. 607,458, dated July 19, 1898.

Application filed February 6, 1897. Serial No. 622,333. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, and more particularly relates to that class thereof designated as "rising-poise" weighing-machines.

The object of the invention is to provide, in connection with weighing mechanism embodying a load-receiver having an advancing movement in contradistinction to an ordinary descending and ascending movement, a load-reducing device or means operative for effecting the reduction of the amount or an overload of material from the receiver preparatory to the final discharge of such material, thereby to obtain a true and correct load to discharge.

A further object of the invention is to provide an improved organization of mechanisms forming an improved weighing machine or apparatus including an improved weighing or poising mechanism embodying an advancing load-receiver shown having successive advancing movements to receive and discharge its load of material.

Prior to my rising-poise patent, No. 572,067, of November 24, 1896, it was the general practice, after the major part of the material was supplied to the load-receiver, to increase gradually such underload by a drip-stream until the load was made up. It was found, however, that in those classes of machines constructed to weigh a large amount of material at one operation this was to a certain extent impracticable, as owing to the impact of even a comparatively small drip-stream, in conjunction with the momentum of the weighing or poising mechanism, the overpoising of such mechanism took place before a true and correct load was made up, and hence to obviate this difficulty was the object of my improved rising-poise apparatus, of which the present machine is an improvement thereon and in which, as in said rising-poise patent, an overload is preferably first supplied and then reduced by a load-reducing device until the correct and true load is obtained, such true load being then discharged from the load-receiver. In my rising-poise patent above referred to this discharge of the true load took place by means of a shiftable closer; but in the present apparatus this discharge is effected by giving to the load-receiver an advancing movement, whereby in the present instance it advances both to receive the load and to discharge the same, this advancing movement being obtained in one structure of apparatus by means of a rotary load-receiver. It will be understood, however, that in practice the reduction of the load may take place not only after the material or an overload thereof has been completely supplied to the load-receiver, but also simultaneously with or during a part of such supply thereto, if desired, as set forth, for instance, in my contemporaneously-pending application, Serial No. 621,044, filed January 28, 1897, and, furthermore, while in the present structure the advancing movement of the load-receiver is shown as taking place only after the load has been properly reduced or decreased by the load-reducing device, yet nevertheless such reduction may be effected simultaneously with the advancing movement of such load-receiver, if deemed desirable, by the mere change of time at which such load-reducing means is thrown into operation.

Figure 2:
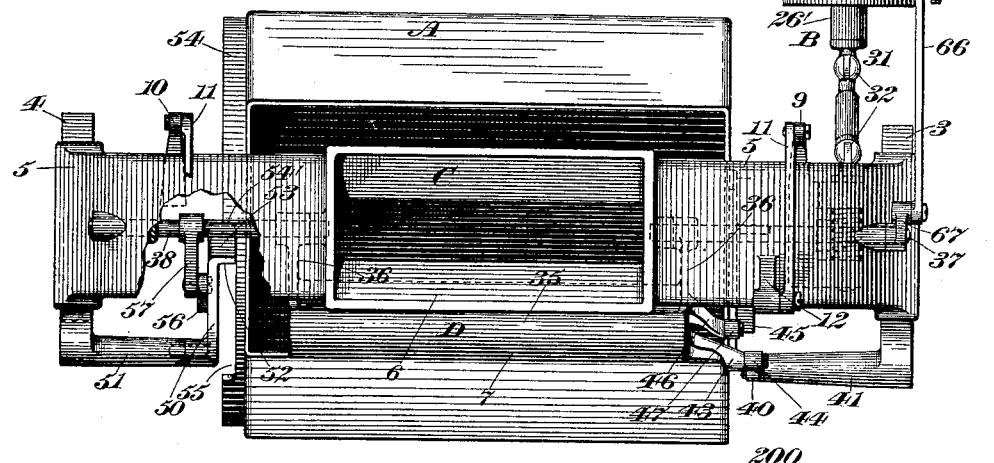
Figure 3:
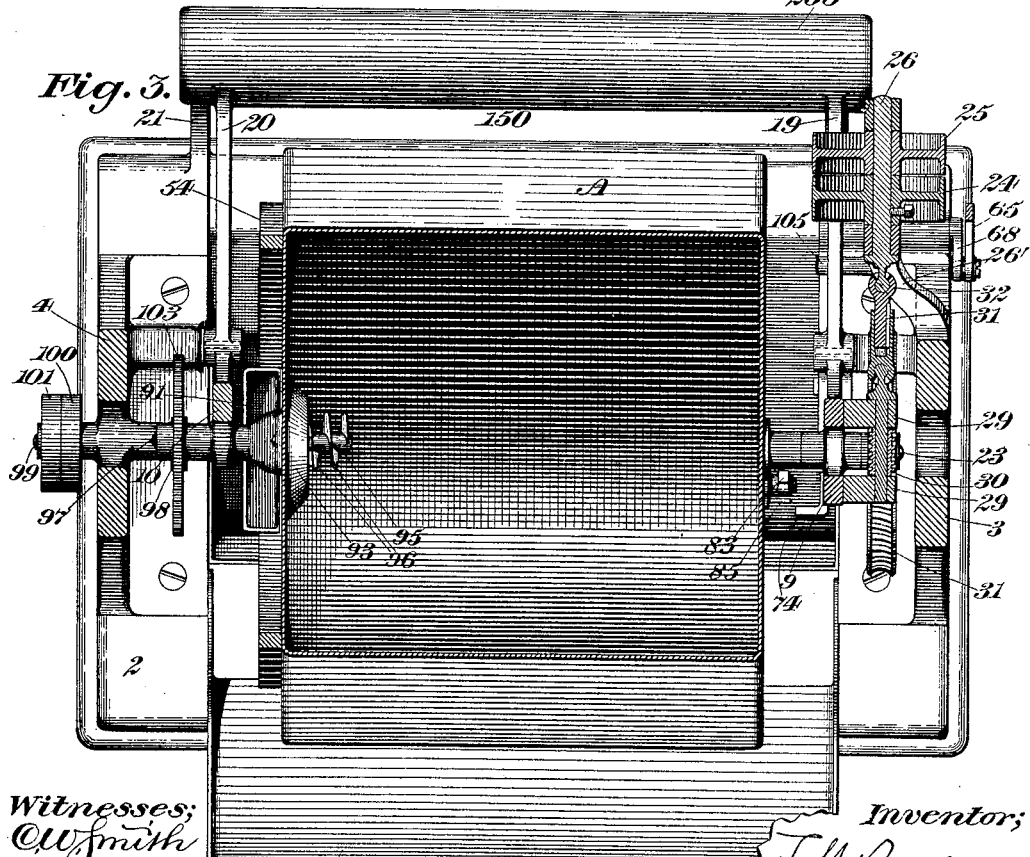
Figure 4:
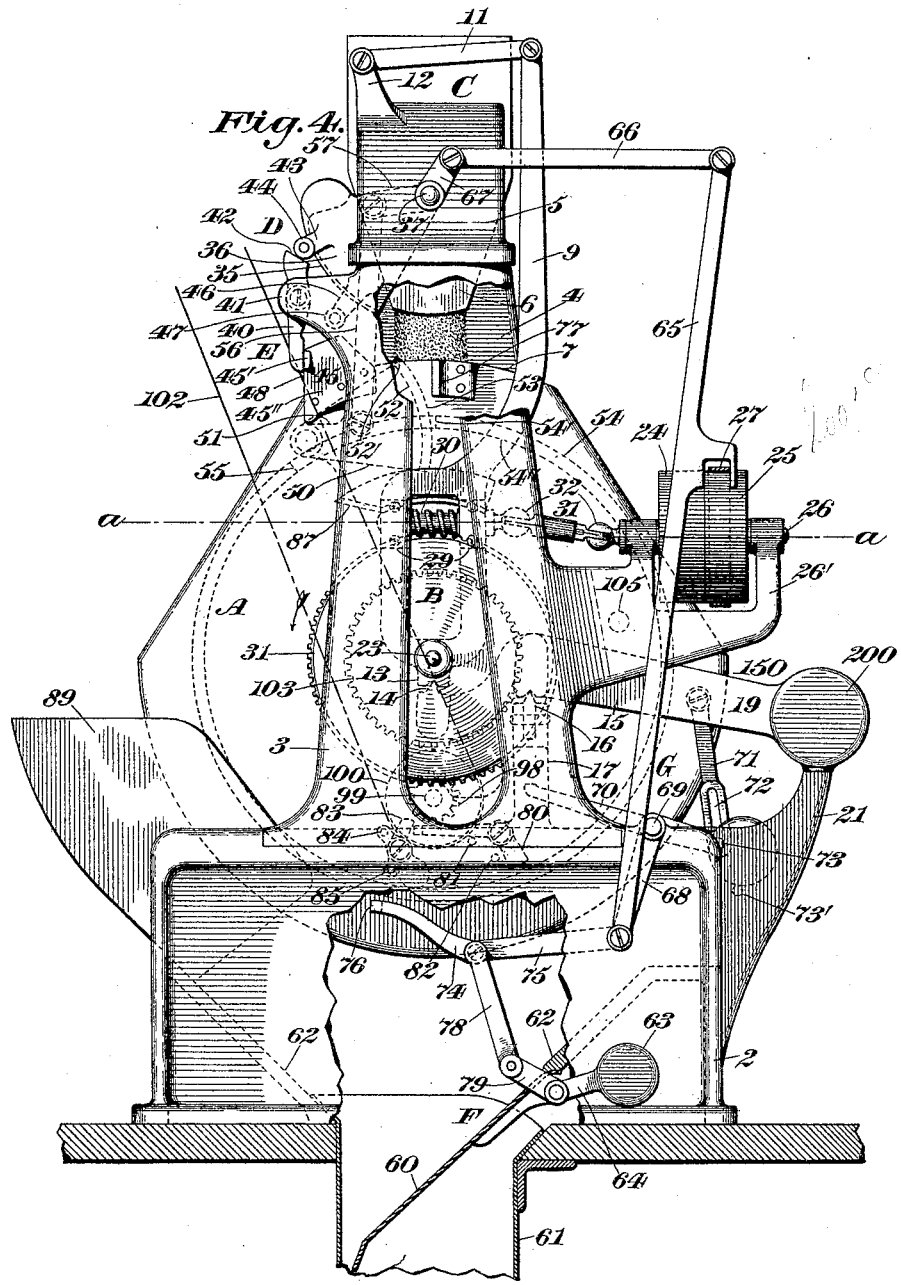
Figure 5:
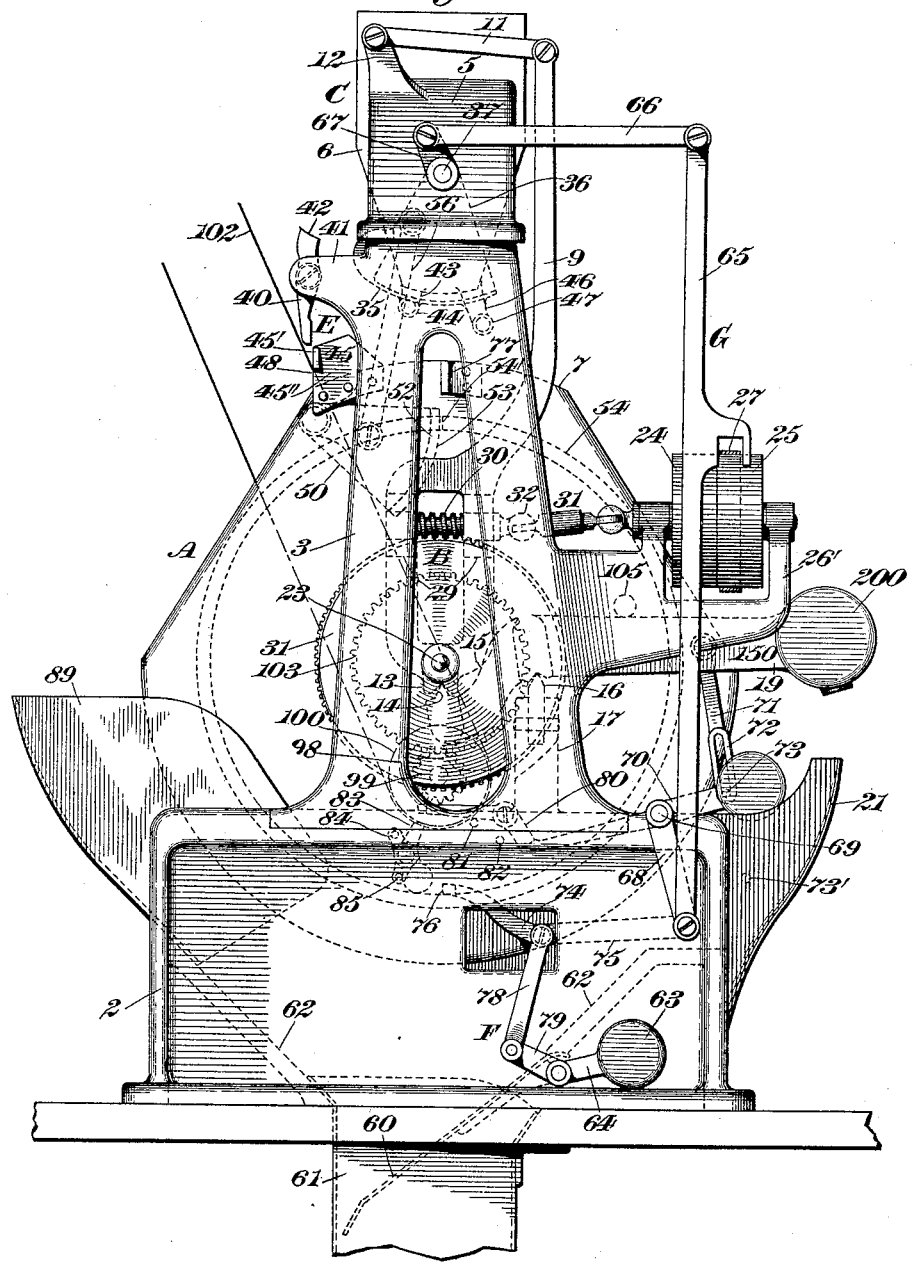
Figure 6:
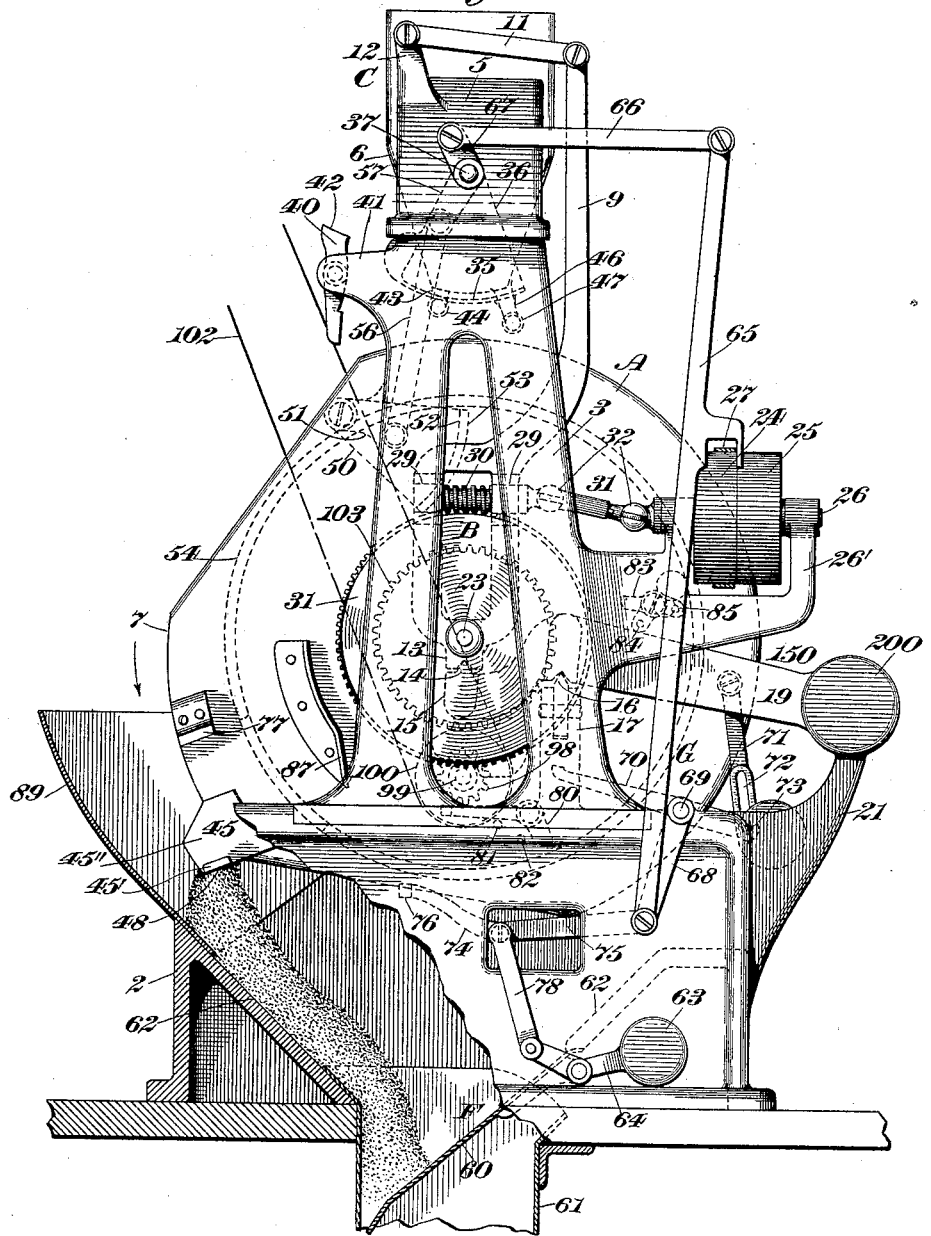
Figure 7:
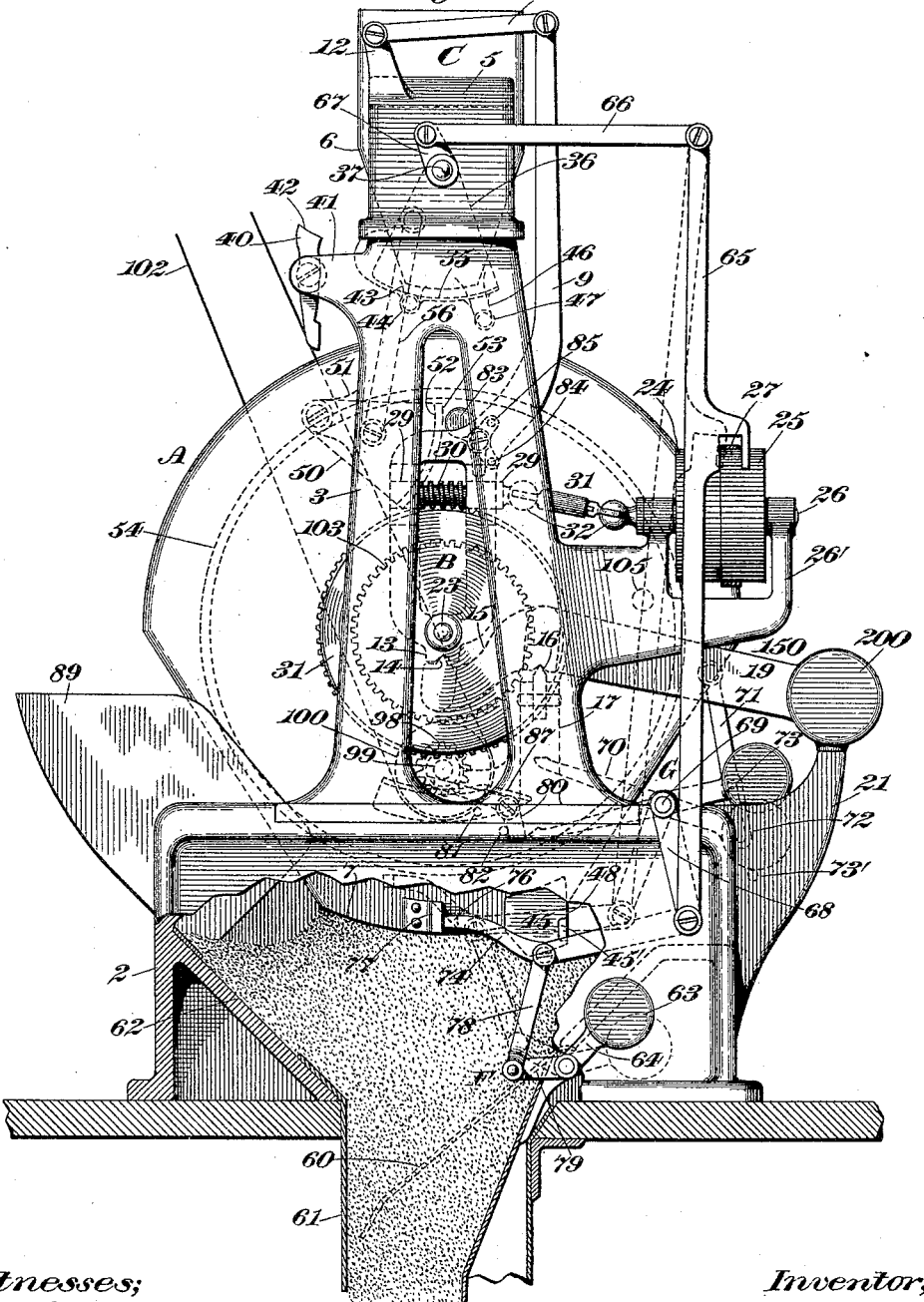

In the drawings accompanying and forming part of this specification, Figure 1, which illustrates this invention by one form of weighing-machine, is a front view of such machine constructed in accordance with said invention and having parts thereof broken away and shown in section to illustrate more clearly the structure of the apparatus. Fig. 2 is a top view of the same, having a part of the framework broken away. Fig. 3 is a cross-sectional view taken in line *a a*, Fig. 4, hereinafter described. Figs. 4, 5, 6, and 7 are right-hand side elevations thereof, some of said figures having parts broken away in section and in dotted lines to illustrate more clearly the structure and operation of the machine. Fig. 8 is a left-hand side elevation of this form of machine, likewise having parts broken away. Fig. 9 is a right-hand end view of the upper portion of the machine, diagrammatically illustrating the different portions of the valve and load-receptacle relatively to each other, said view being also a successive view to those shown by Figs. 4, 5, 6, and 7. Fig. 10 is a cross-sectional view taken in line $b\ b$, Fig. 1, for more clearly illustrating the operating mechanisms shown herein at the right-hand side of the machine; and Figs. 11 and 12 are partly-sectional views of that form of load-reducing mechanism shown herein, the same being illustrated in different positions and in operative connection with the load-receptacle.

Similar characters designate like parts in all the figures of the drawings.

As a preface to a further description of this improved rising-poise weighing-machine it will be understood that the various details herein shown and described may be more or less varied without departing from the general scope of this invention. For instance, various valve and regulator mechanisms may be adapted for use in connection with the other mechanisms shown and described, the invention more particularly comprehending a load-reducing means, instrumentality, or mechanism operative to accomplish the desired object in connection with a load-receiver having an advancing movement in contradistinction to an ordinary descending and ascending movement and operative to effect the discharge of a true and complete load during or after such advancing movement, and therefore it will also be obvious that other reducing means than that herein shown may be used. In fact, any means or instrumentality operative to accomplish or permit a reduction of the material before the final discharge thereof in connection with such a character of load-receiver is considered within the scope of this invention.

This improved weighing-machine comprehends in a general way and in the preferred form thereof herein shown and described an advancing load receiver or receptacle (designated generally by A) shown herein as a rotary load receiver or receptacle operative to make a complete rotation, during which the reception of the load and the final discharge thereof takes place; beam mechanism for supporting the same and which may be of any desired and suitable construction; driving means for said receptacle, (designated in a general way by B;) load or overload supply means, (designated in a general way by C;) stream-controlling means, such as valve mechanism (designated in a general way by D) for regulating such supply to the load-receptacle; locking means (designated in a general way by E) operative to lock the valve closed during the advance of the receptacle and to lock said receptacle against advancing while said valve is open, and which locking means will be herein designated for the purpose of this specification as "duplex" or "valve-receptacle-locking" means; regulator mechanism, (designated in a general way by F;) means or mechanism, (designated in a general way by G,) controlled by a part of the weighing-machine on its operation, for regulating the operation of the load-receptacle-driving means and illustrated herein as operative at different periods by the receptacle, and regulator and valve mechanisms, respectively, whereby said driving means is thrown into and out of operation at the proper predetermined periods to effect and stop the advance of said load-receptacle, and a load-reducing instrumentality, means, or mechanism (designated in a general way by H) operative to reduce or permit to be reduced the amount or overload of the material supplied to or in the load-receptacle to thereby obtain a true and correct load and preferably embodying or having driving means therefor.

Any suitable and desired framework may be used for supporting the operative parts of this improved weighing-machine; but it is herein shown embodying a skeleton base 2, carrying a pair of uprights or side frames 3 and 4, united at the tops thereof by a top plate 5, and which top plate is shown supporting the material-supply means, such as a chute 6 of the ordinary construction, if preferred.

The material or load receiver or receptacle (designated in a general way by A) may also be of any desired construction adapted for the purpose; but it is herein illustrated as a bucket, preferably of the "single-chambered" class or type, supported intermediate the side frames 3 and 4 for advancing movement, and is provided with a mouth 7 for the reception of the material, and which mouth also constitutes the discharge spout or opening of said bucket. One means for supporting this bucket in the construction shown comprises a pair of hangers or arms 9 and 10, one at each side of said bucket, the upper end of each of which is pivotally secured to a connector 11 in the nature of a link, the opposite ends of said links likewise being pivotally attached to brackets 12 of the top plate 5, whereby shifting movement or displacement of the hangers and the bucket carried thereby is prevented. The lower ends of these hangers 9 and 10 are supported by the beam mechanism, and for this purpose each is shown constructed to constitute one member of a bearing, herein illustrated as the bearing member thereof and shown as a V-shaped bearing member 13, adapted to be supported by a bearing-pivot (preferably shown as a knife-edge pivot 14) carried adjacent to the end of each receptacle-supporting arm 15 of the scale-beam 150, and which scale-beam 150 is supported for its usual movement by some suitable bearings, but shown herein substantially similar to the bearings just described, the pivot members 16 of which are shown carried by brackets 17, projecting from the side frames 3 and 4. This scale-beam embodies the usual weight-supporting arms 19 and 20, carrying a suitable counterbalancing-weight 200, shown herein as rigid or integral therewith and supported when in its normal position on a rest or support 21, extending from the rear of the base 2. It will of course be understood that the bearings both for the scale-beam and the receptacle-hangers may be more or less modified or may be of other constructions, if desired, without departing from the scope of this invention. Intermediate these hangers 9 and 10 the load-receptacle is supported for advancing movement, herein illustrated as a rotary movement, and for this purpose it is shown provided with a pair of journals 22 and 23, one at each side thereof and which are supported in bearings of the hangers, one of the journals, as 22, in this particular construction of machine being shown as tubular for the purpose hereinafter set forth, while the other journal, as 23, projects beyond its hanger 9 and the journal-bearing thereof for the reception of a part of the bucket-driving mechanism about to be described.

The driving means (designated generally by B) when independent driving means is used for advancing the load-receptacle—as in this construction preferably by a rotary movement—in one preferred form thereof herein shown and described comprehends suitable power-driven mechanism embodying gear mechanism and intermittently operative to rotate such receptacle at the proper predetermined period, and in the form shown it comprises a fast and loose pulley 24 and 25, respectively, supported by a shaft 26, journaled in a bracket 26', carried by one of the side frames 3, said loose pulley 25 being connected by a shiftable belt 27 with any suitable source of power, such as a motor, (not shown,) whereby it is continuously rotatable until such belt is shifted therefrom by the means and in the manner hereinafter set forth onto the fast pulley that is keyed to said shaft 26.

Journaled in a pair of bearings 29 of one of the hangers, as 9, is one driving member of the gear mechanism and shown herein as a worm 30 and which is in position to engage its companion or driving member, such as worm-wheel 31, fixedly secured on the end of the journal 23 of the bucket. This rotatable worm 30 is coupled to the pulley-shaft 26 by some suitable means, whereby motion is imparted to said worm on the rotation of the fast pulley 24, and which means will also permit the ascent and descent of the bucket at the proper time, and for this purpose the worm is shown connected with the shaft of the pulley by a longitudinally-adjustable coupling 31, having a universal-joint connection with such pulley-shaft and worm, and which universal joints 32 may be of any desired and suitable construction adapted for the purpose. This longitudinal adjustment is secured in this instance by an ordinary splined connection between the members 31' and 31", forming the coupling 31.

From the foregoing it will be seen that on the operation of the fast pulley 24 the worm will be rotated, and thereby the worm-wheel, and thus rotary motion imparted to the load-receptacle.

The load-receptacle is supplied with material to constitute its load by a supply-chute 6, as hereinbefore set forth, and which chute may be connected in any desired way with a suitable source of supply, whereby such material is fed to the chute and from thence to the bucket. It will be obvious, however, that any other feeding means deemed practicable may be used, if preferred. To regulate this supply of material to the receptacle, suitable stream-controller, such as valve mechanism, (designated in a general way by D,) is provided, and preferably comprises a concaved valve-blade 35, having a pair of sector-shaped side walls 36, fixedly secured to rock-shafts 37 and 38, each of which is journaled in a side wall of the supply-chute 6 and one part of the top plate 5, whereby said shafts in practice operate as one member.

For holding the valve open during the loading period of the weighing-machine suitable means is provided, and which preferably comprises a shiftable member 40, shown herein pivotally secured to an arm 41, carried by one of the side frames, as 3, and having a working cam-face 42, operative to engage a coacting arm or member 43, carried by said valve and provided with an antifriction bearing or roll 44, said shiftable member 40 having a part thereof in position to be engaged by a locker 45, herein shown formed by a lateral projection 45' and bracket 45", secured to the bucket, whereby when the bucket is in its normal raised position such locker will engage the shiftable member 40 and prevent movement of the same, and thereby prevent the closing of the valve to cut off the flow of material to said bucket. When, however, the bucket descends with its overload or supply of material, the locker 45 moves therewith and below the lower end of the shiftable member 40, thus releasing or unlocking the same, whereby the valve, owing to its weight, obtained either by its construction or by the addition of a weight thereto, as preferred, oscillates such shiftable member, whereby said valve is permitted to close and quickly cuts off the supply of material to the bucket. After the discharge of material from the bucket in the manner hereinafter set forth and while said bucket is being rotated into position to be again supplied with a load the valve is opened, and for this purpose said valve is shown provided with an arm 46, likewise carrying an antifriction bearing or roll 47 in position to be engaged by a cam-face 48, formed on the bracket part 45" of the locker 45, whereby said locker thus becomes also an actuator for opening the valve, and hence may be herein designated for the purposes of this specification and for the sake of brevity as a "locker" or "actuator-locker," as deemed desirable, and by means of which, as the bucket nearly completes its rotary movement, Fig. 9, having previously reascended above its poising position on the discharge of its load, such cam-face 48 comes into engagement with said bearing-roll 47 and simultaneously with this part of the rotary movement of the bucket opens the valve, which is then locked open by the bearing-roll 44 engaging the cam-face of the shiftable member 40, which member is held against movement by the locker 45 engaging the same at this time. In order, however, that the bucket may be stopped at each rotation at the same predetermined point, and which stoppage in this form of machine is effected by the opening of the valve in the manner hereinafter set forth, the complete opening of such valve is preferably obtained by the engagement of the locker 45 with the shiftable member 40 (see dotted lines, Fig. 9,) instead of by the cam-face 48 of said actuator-locker, whereby said member 40 is shifted to move its cam-face beneath the roll 44, and thus completely opens the valve. This final opening movement of the valve completely shifts the driving-belt 27 from the fast to the loose pulley, thus stopping the bucket at the same predetermined point at each rotation, which would not be the case if the valve were completely opened by the cam-face 48 of the locker 45, as in practice such cam-face would have a tendency to permit the bearing-roll 47 to stop at different points thereon, and thus open the valve more at one time than at another, and consequently resulting in the imperfect action of the shipping mechanism hereinafter described.

To lock the valve closed during the rotation of the bucket and also to lock the bucket against rotary movement while the valve is open, suitable locking mechanism (designated in a general way by E) is provided, and in the form shown it comprehends interlocking means comprising an oscillatory member or locker and a rotary member or locker; and in the preferred form thereof herein shown and described this oscillatory member comprises a sector-shaped stop 50, pivotally secured to an arm 51, projecting from one of the side frames, as 4, and which stop 50 has a laterally-extending curved rim or flange 52, having convex working face 53. The other or rotary member of this interlock is herein shown comprehending a circular rim or flange 54, carried by or formed on one side of the bucket and of relatively large diameter and provided with a cut-away portion, opening, or recess 55 of sufficient width to permit at the proper time the required oscillatory movement of the sector-stop and which opening or cut-away portion is coincident with the mouth of the bucket. This sector-stop 50 is operatively connected with the valve for operation thereby by means of a connector 56, such as a link pivotally secured to said stop and to a rock-arm 57, carried by the rock-shaft 38, whereby when the valve is open the curved working face 53 of said stop flange or rim 52 is in engagement with the end 54' of the circular rim or flange 54 constituting the rotary locker, whereby rotative movement of said bucket is prevented in a manner that will be readily understood, such locking action, however, in no wise affecting the reciprocatory or poising and overpoising movement of the bucket. As the valve closes the locker 50 is oscillated into position to carry its flange 52 out of engagement with the end 54' of said circular flange 54 and inside of the same, whereby on the rotation of the bucket by its driving mechanism the inner face 54" of said circular flange 54 engages the end 52' of said locker, and thus prevents the upward movement of the same, and consequently the opening of the valve, during the major part of the rotation of such bucket and until the same is in position to again receive the material from the supply means. When, however, the valve-actuator 45, carried by the bucket, is in position to engage the roll 47 of the valve and thereby open said valve, on the further rotary movement of said bucket, Fig. 9, the cut-away part or opening 55 of the rotary locker is likewise in position to permit the oscillatory locker 50 to be moved upward simultaneously with the opening of said valve, whereby the bucket is again locked against rotary movement in the manner above set forth.

In this construction of weighing apparatus is embodied suitable regulator mechanism (designated in a general way by F) operative to control at a predetermined point in the operation of the weighing-machine one part of said machine, shown herein as the receptacle-driving means, through the medium of the shipper mechanism hereinafter described, and in the preferred form shown such regulator mechanism comprehends a pivotally-disposed regulator-blade 60 in position to work in a discharge-chute 61 below the bucket A, the upper part of said chute being shown formed by a pair of inclined stream-directing walls 62, carried by the base 2, whereby the material emptied or discharged from the bucket is carried into position to operate said regulator-blade 60, which is provided with a counterbalancing-weight 63, carried by an arm 64, extending from said blade, whereby said regulator operates in the usual manner on the discharge of the bucket-load. The regulator is shown constructed with a downwardly-extending flange, whereby the lifting of the material is prevented as the blade moves into its normal position.

In order to control the load-receptacle-driving means and thereby regulate the rotation of said receptacle to permit the same, after it has in this construction of apparatus re-received its true load, to be rotated into position to discharge such load and also be stopped at such position to insure such complete discharge, and which is shown herein at a point approximately diametrically opposite the position in which it receives the load, and after such discharge to be rotated into position to receive another load, controlling means or mechanism is provided, (designated in a general way by G,) operative in the present structure by a part of the weighing-machine on the operation thereof to accomplish the results above set forth, and in the preferred form thereof herein shown and described this controlling mechanism embodies suitable shipper mechanism operative to shift the driving-belt 27 from the loose to the fast pulley, and vice versa, of the driving means at predetermined times in the operation of the machine, and which controlling means is shown herein operative through the medium of the load-receptacle, regulator, and valve mechanisms, substantially in the manner herein set forth.

Referring now to the particular construction of controlling means herein illustrated and which, it will be understood, may be more or less modified without departing from the general scope of this invention, or other controlling means may be used in place thereof, if desired, it is shown comprehending a lever system embodying a belt-shipper 65, adapted to engage the driving-belt 27. The upper end of this shipper is operatively connected with the supply-valve by a connector 66, such as a link, which is pivotally secured at one end to the shipper and at its opposite end to a rock-arm 67, fixedly secured to one of the rock-shaft members 37, and shown so connected therewith that on the closing movement of the valve the shipper is actuated toward the fast pulley 24 and on the opening movement of said valve is moved toward the loose pulley 25. The lower end of this belt-shipper 65 is likewise pivotally secured to the lower end of a connector in the nature of a link 68, the upper or opposite end of which is in turn fixedly secured to a journal or shaft 69, journaled in the base 2. The opposite end of this shaft 69 carries a shipper-actuator, shown herein as a counterweighted member or arm 70, fixedly secured to said shaft and operatively connected with the beam mechanism by a slotted connector 71 in the nature of a link, one end of which is shown pivotally secured to one of the weight-arms, as 19, of the scale-beam 150, while the slotted part 72 thereof works on a pin 73, carried by said weighted shipper-actuator. The descent of the weighted end of this actuator is limited by a stop or pin 73'. This weighted actuator 70 is connected to a shiftable member 74, herein designated as a "stop" member, by means of a connector 75, (see Figs. 1 and 10,) fixedly secured at one end to said actuator 70 and pivotally secured at its opposite end to said stop member 74, the latter being provided with a stop or working face 76 in position to be engaged at a predetermined period in the operation of the machine by a coacting member or stop 77, carried by the bucket and operative in the manner hereinafter set forth. This stop member 74 is connected to the regulator-blade by a pair of connectors, shown in the nature of a toggle-lever 78 79, one member, as 78, being pivotally secured to the stop member, while the other member, 79, is fixedly secured to the hub of the regulator-blade at the inner end of the weighted arm 64 thereof.

From the foregoing it will be seen that when the bucket descends after receiving an overload the weight-arms 19 and 20 of the scale-beam are raised, thereby simultaneously raising the weighted end of the shipper-actuator 70, the inner end of which is thus moved downward into position to be engaged by a locker 80, pivotally secured to the base 2 and held in position for operation by suitable stops, as stop-pins 81 and 82, whereby on such operation of the shipper-actuator 70 the lower end of the belt-shipper 65 is moved toward the loose pulley, so that as the valve closes and the upper end of said shipper is shifted toward the fast pulley such shipper will be in approximately perpendicular position, with the belt remaining on the loose pulley in readiness, however, to be shipped onto the fast pulley at the next operation of said shipper. When the load in the bucket has been reduced by the reducing mechanism hereinafter described and said bucket rises to its poising position with its true load, the locker 80 is actuated to release or unlock the shipper-actuator 70, and for this purpose the bucket is shown provided with a counterbalanced trip member or tripper 83 in the nature of a by-pass held in position for operation by suitable stops, as stop-pins 84 and 85, whereby on the upward movement of the bucket to said poising position the by-pass tripper 83 engages the free end of the locker 80 and shifts the same, thereby unlocking the shipper-actuator 70, the weighted end of which immediately descends, and thus actuates the shipper 65 toward the fast pulley, whereby the driving-belt 27 is moved onto the fast pulley and motion thus imparted to the worm, and thereby to the worm-wheel and the bucket rotated with its load, Fig. 6. When, however, the bucket has made a half-rotation and the mouth thereof is substantially diametrically opposite in the present structure to its loading position, it is desirable to stop the further rotation of such bucket until the load has been completely discharged, and hence when the shipper moves into position on the ascent of the bucket to shift the belt onto the fast pulley the stop member 74 is shifted into position, Fig. 6, to be engaged at the proper time by the bucket-stop 77, hereinbefore mentioned, whereby as such bucket-stop 77 engages such stop member 74, Fig. 7, the continued rotation of the bucket forces such member 74 rearwardly, and thereby actuates the shipper to shift the belt from the fast to the loose pulley, whereby further rotation of the bucket at this time ceases. This movement of the shipper simultaneously raises the weighted end of the actuator 70, it being held in such position by the coaction at this time of the stop member 74 and bucket-stop 77, and hence to prevent the locker 80 from engaging the inner end of said actuator at this period, and thus maintain the same locked after the disengagement of the bucket-stop 77 and stop member 74, the bucket is shown provided with a cam member 87, operative to engage the locker at this period and hold the same away from engagement with said weighted actuator member 70.

As before stated, the discharge of the bucket-load operates the regulator-blade in the usual manner. When all appreciable amount of material has passed from the regulator-blade, the same returns to its normal position, thereby moving the stop member 74 into position above the bucket-stop 77, which thereby permits the descent of the weighted end of the shipper-actuator, (see dotted lines, Fig. 7,) and consequently the operation of the shipper into position to move the belt onto the fast pulley, whereby the continued rotation of the bucket into position to receive another load takes place. When, however, the bucket has nearly completed its rotation, the cam-face 48 of the actuator 45 engages the roll 47 of the valve and opens said valve in the manner hereinbefore set forth, which thus again operates the shipper to move the belt from the fast to the loose pulley, whereby further rotation of the bucket is prevented. Thus it will be seen that on the descent of the bucket with an overload and on the closing of the valve the shipper is moved into position in readiness to shift the belt from the loose to the fast pulley, whereby on the ascent of the bucket to its poising position the belt is shifted onto the fast pulley and the bucket is rotated. When the mouth of the bucket reaches a position substantially diametrically opposite to its loading position, the belt is again shifted onto the loose pulley, whereby the rotation of the bucket ceases. After the discharge of the load from the receptacle and all appreciable amount thereof has passed the regulator said regulator returns to its normal position, whereby the belt is again moved onto the fast pulley and the rotation of the bucket continued, and which bucket at the proper time opens the valve and thus returns the belt to the loose pulley, whereby further rotation of said bucket ceases.

From the foregoing it will be observed that by and on the ascent of the bucket to its poising position with a true load the driving mechanism is operated to rotate the bucket, that by and on the rotation of the bucket to its half-way or discharging position the driving mechanism is thrown out of operation and the further rotation of the bucket stopped, that by and on the return of the regulator after all appreciable amount of material has passed thereby the driving mechanism is again thrown into operation to continue the rotation of the bucket into position to receive another load, and that by and on the rotation of the bucket into its load-receiving position the supply-regulating valve is opened, and thereby the driving mechanism finally thrown out of operation, whereby further rotary movement of said bucket ceases, so that it will be readily seen that through the medium and action of the bucket the driving mechanism is first thrown into action and then temporarily out of action, and then by the opening of the valve effected by the bucket is finally thrown out of action, and that through the medium of the regulator the driving mechanism is thrown into action intermediate and alternately with its temporary and final throw out of action by the bucket, so that such driving mechanism is controlled in its operation by different parts of the weighing-machine, shown in the present structure by those parts thereof comprehending the load-receptacle, the supply-valve, and regulator mechanisms.

During the rotation of the bucket with its load the material will in practice in this structure of apparatus commence to discharge when the mouth thereof descends below a horizontal plane, and therefore, in order to convey such discharged material into the discharge-chute, an apron 89 is provided adapted to project into position to catch such material on its discharge and direct the same into the discharge-chute.

As the primary object of this invention is to obtain a true and correct load by the reduction or decrease of the material or overload within a load-receptacle having an advancing movement as contradistinguished from an ordinary ascending and descending movement, rather than by the increase of an underload therein, and to obtain such reduction by means operative to reduce, convey, feed, or discharge, or cause or permit to be reduced, discharged, conveyed, or fed from such receptacle, a portion of such load, preparatory to the final discharge or disposition of said load, an instrumentality, means, or mechanism operable to accomplish this result and herein termed, for the purposes of this specification, as "a load-reducing device, instrumentality, mechanism, or means" is provided, and one preferred form thereof herein illustrated, and which load-reducing means in this instance is shown as commencing its operation on the descent of the bucket, due to an overload thereof, and substantially simultaneously with the closing of the valve, such reduction continuing until the load in the bucket is sufficiently reduced to permit said bucket to rise to its poising position. It will be obvious, however, that such reducing mechanism may be so timed that it may commence to operate before the valve commences to close or while closing, whereby the reduction would take place during a partial supply of material to the bucket, as hereinbefore mentioned. While this load-reducing mechanism (designated in a general way by H) may comprehend an instrumentality similar to that shown and described in my prior patent, No. 572,067, dated November 24, 1896, or any other means operative to permit or cause a reduction or discharge of a portion of the material from said bucket, it is, however, herein illustrated in its preferred form for accomplishing in one way the reduction or decrease of the load before the final discharge of the material from said load-receptacle, as comprising an instrumentality, means, or mechanism operative to convey, discharge, or feed a part of the material from said load-receptacle, and hereinafter designated, for the purposes of brevity, as a "feeder," "discharger," or "conveyer," and driving means shown herein embodying geared mechanism for actuating the same at a predetermined period in the operation of the weighing mechanism, whereby such load-reducing mechanism will perform its proper work accurately and quickly.

The load-receptacle is shown provided with an opening 90 at one side thereof, disposed above and communicating with a material surplus or excess conduit 91, which may, if desired, be connected with any suitable reconveying means embodying elevator mechanism similar, if preferred, to that described in my prior patent above referred to, whereby the surplus material may be conveyed into position to be again supplied to the load-receptacle for a succeeding load. That portion of the outer wall of the bucket which is beneath said opening 90 when the receptacle is in its upright position is provided with an inclined wall 92 for directing the discharging material into the conduit 91, while the inner wall of said bucket around said opening is shown so constructed that the material will be prevented from flowing through the opening, except when the reducing means is in operation, and for this purpose such inner wall is shown provided with inclined walls or projections 93, adapted to direct the material away from said opening.

Within the bucket and adjacent to the opening 90 thereof a load-reducing instrumentality—such as a conveyer, feeder, or discharger—is disposed for operation, and it is herein illustrated comprising a rotary instrumentality preferably having a plurality or series of working members or blades 96, forming a spiral conveyer 95, the shaft 97 of which is journaled in the tubular journal 22 of the bucket and projects beyond the same and the hanger 10, and carries on its outer end a part of the driving means for said rotary reducing instrumentality.

The driving means in the present instance comprehends a continuously-rotatable pinion 98, carried by a shaft 99, journaled in one of the side frames, as 4, the outer end of which carries a fast and loose pulley 100 and 101, respectively, connected by a belt 102 with any suitable source of power, such as a motor, if desired, (not shown,) and which may or may not, as found practicable, be the same as that with which the driving-belt 27 of the bucket-driving mechanism is connected. On the end of the spiral conveyer-shaft 97 a gear-wheel 103 is fixedly secured in position to mesh with the pinion 98 on the descent of the bucket below its position of poise, whereby as such bucket descends with its overload or surplus amount of material this pinion 98 will engage the gear-wheel 103 and actuate the same to rotate the conveyer, feeder, or discharger so long as the teeth of gears remain in mesh, whereby a continuous stream of material will be forced out of the opening 90 until a true and correct load is obtained, whereupon the bucket rises to its poising position, thereby disengaging the gear-driving mechanism and thus stopping the reduction of the load, after which the rotation of the bucket takes place, in the manner hereinbefore set forth, to discharge such load.

Suitable means is preferably provided to limit the downward movement of the bucket to thus prevent the too-tight engagement of the driving-gears, and in this instance such means is shown as a stop 105, carried by one of the side frames, as 3, and in position to prevent the upward movement of the scale-beam 150. In practice it is deemed preferable to make the ends of one of the gears—as, for instance, gear 103—somewhat sharp, whereby they will ride or slip over the end of the pinion-teeth on the descent of the bucket, and thus always insure the meshing of the same in a proper manner.

The general operation of a weighing-machine constructed in accordance with this description is substantially as follows: The load-receptacle being in its normal inoperative position and locked against rotative movement by the interlocking means, and the valve open, the flow of material from the supply-chute is continuous and uninterrupted. When, however, an overload has been supplied to the bucket the same descends, thus unlocking and permitting the valve to close, and at which time the load-reducing mechanism is thrown into operation by the intermeshing of the gears and the reduction of the load takes place, such reduction continuing until all of the surplus or overload has been discharged from the bucket, whereupon said bucket, with its true and correct load, is brought to its poised position, thereby stopping the reducing mechanism and throwing the bucket-driving mechanism into operation to rotate the bucket into position to discharge the load, and which rotary movement locks the valve closed, as hereinbefore stated. When the bucket has rotated halfway around, it operates temporarily to throw the driving means out of operation, whereby further rotation of the bucket at this time ceases and the complete discharge of the load is thus insured. After such discharge of the load from the bucket and all appreciable amount thereof has passed the regulator said regulator returns to its normal position, thereby again throwing the driving mechanism into operation to complete the rotation of the bucket, which during its return movement opens the valve in the manner above set forth, and thereby again throws the driving mechanism out of operation and the stoppage and locking of the bucket against further rotary movement until the succeeding true and correct load has been received thereby.

From the foregoing it will be seen that not only is a true load obtained by the reduction of an overload, thereby to permit the load-receiver to ascend to a poise position instead of descend thereto, as in the case of the gradual increase of an underload, but that in the present construction the load-receiver is advanced or rotated into position directly from its poise position to discharge its load, whereby as heretofore in my rising-poise patents the discharge of the load takes place at the poise position of the load-receiver or weighing mechanism. Furthermore, it will be observed that the operation of the load-receptacle-driving means is controlled by parts of the weighing-machine—in this instance through the medium of a reciprocatory and rotary load-receptacle regulator and valve mechanisms—and the operation of the load-reducing means is likewise controlled by a part of said weighing-machine, in this instance through the medium of a reciprocatory load-receptacle.

It will of course be understood that the operating mechanisms are so timed that the working thereof will take place in their proper sequence, and that by changing the time of such operations the supply to the bucket may continue after the reducing mechanism has commenced to operate, such supply, if desired, being reduced to a drip during the gradual descent of said bucket, and that said reducing mechanism may be brought into operation at any desired point in the descent of the bucket and continue in operation during the partial advance or rotation thereof, if preferred.

Having described my invention, I claim—

1. The combination of weighing mechanism embodying a load-receiver having successive advancing movements to receive and discharge a load, and intermediate thereof successive overpoising and poising positions to obtain a true load to discharge; a mechanism operative to effect such results, and including a positively-acting load-reducing device operative to reduce the load preparatory to said discharge.

2. The combination of weighing mechanism embodying a load-receiver having advancing movements to receive and discharge a load; driving means for advancing said load-receiver; load-supply means for said receiver; and positively-acting load-reducing means operative to reduce the load preparatory to said discharge.

3. The combination of a load-receiver having successive advancing movements in a circular path to receive and discharge a load, and intermediate thereof successive descending and ascending movements; driving means for advancing said load-receiver; and positively-acting load-reducing means operative, intermediate the successive advancing movements of said receiver, to reduce the load preparatory to its final disposition.

4. The combination of a rotary load-receiver; load-supply means therefor; load-reducing means continuously movable during the entire load-reducing period, to permit or cause to be reduced the load in said receiver preparatory to the final discharge thereof; and means operative to impart rotary movement to said receiver, thereby to rotate the same into position to discharge the load therefrom.

5. In a rising-poise weighing-machine, the combination with a movable load-receiver, of the following instrumentalities: load-supply means; positively-acting load-reducing means operative to reduce the load preparatory to the final discharge thereof; and means operative to upset said receiver to effect the discharge of the load therefrom.

6. The combination with a movable load-receiver, of the following instrumentalities: overload-supply means; a load-reducing positively-acting conveyer operative to reduce the load preparatory to the final discharge thereof; and means operative successively to upset said receiver to effect the discharge of the load therefrom and to return said receiver into its normal position to receive a load.

7. The combination with a load-receiver having successive load-receiving, overload, true-load and load-discharging positions, of overload-supply means therefor; positively-acting load-reducing means operative to reduce the load preparatory to the final discharge thereof, thereby to permit the load-receiver to move to its true-load position; and means operative to actuate said receiver from its true-load position to its load-discharging position, thereby to permit the discharge of the load.

8. The combination with weighing mechanism including an advancing load-receiver, of load-supply means therefor; load-reducing means operative to reduce the load preparatory to the final disposition thereof; and means for advancing said receiver simultaneously with the operation of said load-reducing means, thereby to permit the discharge of the load at the proper predetermined period.

9. The combination, with framework, of a rotary load-receptacle journaled therein for rotary movement; load-supply means; positively-acting load-reducing means supported by the journal of the load-receptacle and operable to reduce the load in said receptacle before the final discharge thereof; and means for rotating said receptacle to thereby effect the final discharge of the load.

10. The combination, with a rotary load-receptacle, of the following instrumentalities: overload-supply means; positively-acting load-reducing means operative to force a part of such load from the receptacle thereby to bring the load to a poise preparatory to the final discharge thereof; and driving means operable to rotate said receptacle into position to effect the discharge of the load.

11. The combination with an advancing load-receiver, of the following instrumentalities: load-supply means; a load-reducing conveyer operative to permit or reduce the load in said receiver preparatory to the final discharge thereof; mechanism for continuously operating said conveyer and driving means for advancing said receiver, thereby to discharge the load.

12. The combination, with a rotary load-receptacle, of the following instrumentalities: overload-supply means; a load-reducing instrumentality comprising a conveyer, feeder, or discharger operative to permit or cause a part of the load to be conveyed, fed, or discharged from the receptacle thereby to bring the load to a poise preparatory to the final discharge thereof; and means operative to rotate said receptacle into position to discharge the load.

13. The combination, with a rotary load-receiver, of the following instrumentalities: overload-supply means; positively-acting load-reducing means carried by the receiver and operative to reduce the load therein preparatory to the final discharge thereof; and driving means operative to rotate said receiver into position to effect the discharge of the load.

14. The combination, with weighing mechanism embodying a rotary load-receptacle, of load-supply means therefor; load-reducing means comprising a spiral device operative to reduce the load before the final discharge thereof; and driving means operative to rotate said receptacle into position to discharge the load.

15. The combination, with a rotary load-receptacle, of load-supply means therefor; load-reducing means comprehending a plurality of members operative to discharge a continuous stream of material from said receptacle thereby to bring such load to a poise preparatory to the final discharge of the load; and driving means operable to rotate said receptacle into position to discharge the load.

16. The combination, with a rotary load-receptacle, of load-supply means therefor; load-reducing means comprising a propeller operative to propel a part of the load from said receptacle before the final discharge thereof; and means operative to rotate said receptacle into position to discharge the load therefrom.

17. The combination, with a rotary load-receptacle having an outlet or opening at one side thereof, of load-supply means; load-reducing means for positively passing through said outlet or opening a part of the load in said receptacle thereby to bring the load to a poise preparatory to the final discharge of said load; and driving means operative to rotate said receptacle, to thereby effect the final discharge of the load.

18. The combination, with a load-receptacle having successive advancing movements to receive and discharge a load, of the following instrumentalities: load-supply means; load-reducing means operative simultaneously with during a part of the load-supply to bring the load to a poise preparatory to the final discharge thereof; and driving means operative to advance said receptacle into position to discharge and receive its load.

19. The combination, a movable load-receiver having successive overpoising and poising positions; of load-supply means therefor; rotary load-reducing means operative, when the receiver is in its overpoise position to reduce the load therein thereby to bring the load to a poise preparatory to the final discharge thereof; and driving means for actuating said receiver into position on its return to its poise from its overpoise position, to thereby effect the discharge of the load.

20. The combination, with a load-receptacle having successive advancing movements to receive and discharge a load, of means for supplying material thereto to effect the overpoising of the same; rotary load-reducing means operative to reduce the load in said receptacle thereby to bring the load to a poise preparatory to the main discharge thereof; and driving means operative to advance said receptacle on its ascent to its poising position, to thereby effect the discharge of the load therein and after such discharge advance said receptacle into position to receive another load.

21. The combination, with a rotary load-receptacle, of the following instrumentalities: load-supply means; rotary load-reducing means operable to reduce the load thereby to bring said load to a poise preparatory to the final discharge thereof; and driving means operative to rotate said receptacle into position to effect the discharge of the load therein.

22. The combination, with a reciprocatory and rotary load-receptacle, of means for supplying material thereto to effect the overpoising of the same; rotary load-reducing means operative during a part of the reciprocatory movement of said receptacle to reduce the load therein, thereby to bring such load to a poise preparatory to the final discharge thereof; and driving mechanism operative on the ascent of said receptacle to its poising position to rotate the same into position to discharge the load therefrom.

23. The combination, with an upsettable load-receptacle having successive overpoising and poising positions; of load-supply means therefor; rotary load-reducing means operative to reduce the load on the overpoising of said receptacle, thereby to bring the load to a poise preparatory to the final discharge thereof; and means for upsetting said receptacle, on its return to its poise from its overpoise position, to thereby effect the discharge of the load.

24. In a weighing-machine, the combination of a load-receptacle having successive advancing movements to receive and discharge a load; a load-reducing instrumentality operative to bring the load to a poise preparatory to the final discharge thereof; driving means operative to advance said receptacle; and means controlled by a part of said weighing-machine, for regulating the operation of said driving means.

25. In an automatic weighing-machine, the combination of a movable load-receptacle having successive advancing movements to receive and discharge a load and intermediate thereof successive overpoising and poising positions to obtain a true load to discharge; and mechanism operative to effect such results and comprehending driving means controlled by a part of said weighing-machine and operative to advance said receptacle, load-supply means, and load-reducing means operative to reduce, at the proper period and before the final discharge thereof, the load supplied to said receptacle, thereby to bring said load to a poise preparatory to the final discharge thereof.

26. In a weighing-machine the combination of a rotary load-receptacle; load-supply means therefor; load-reducing means operative to bring the load to a poise preparatory to the final discharge thereof; driving means operable to rotate said receptacle into position to discharge the load; and means controlled by a part of the weighing-machine, for regulating the operation of said driving means.

27. In a weighing-machine, the combination of weighing mechanism operative to weigh a load, and embodying an advancing load-receiver; positively acting load-reducing means therefor; driving means operative to advance said receiver; and means controlled at different periods by different parts of the machine for regulating the operation of said driving means.

28. In a weighing-machine, the combination of weighing mechanism operative to weigh a load, and comprising beam mechanism and an advancing load-receiver; load-reducing means therefor; driving means operative to advance said load-receiver; means controlled at one predetermined period by the beam mechanism, and at another predetermined period by the load-receiver, said receiver having a movement independent of the beam mechanism for regulating the operation of said driving means.

29. In a weighing-machine, the combination with a rotary load-receptacle, of load-supply means therefor; load-reducing means operative to bring the load to a poise preparatory to the final discharge thereof; driving means operative to rotate said receptacle into position to discharge the load; and means controlled by the weighing-machine, through the medium of the receptacle, for regulating the operation of said driving means.

30. The combination, with a reciprocatory and advancing load-receptacle; of load-supply means for said receptacle; load-reducing means operative before the final discharge of the load to reduce said load; driving means for advancing said receptacle; means for regulating the operation of said driving means and thereby the advance of said receptacle and partly controlled by the receptacle on its reciprocatory and advancing movement.

31. The combination of a load-receptacle having successive advancing movements to receive and discharge a load; load-supply means therefor; valve mechanism for regulating the supply of material thereto; load-reducing means operative to reduce the load before the final discharge thereof; driving means for advancing said receptacle; and means for regulating the operation of said driving means and thereby the advancing movement of said receptacle and partly controlled by said valve mechanism on the operation thereof.

32. The combination, with a load-receptacle having successive advancing movements to receive and discharge a load, of load-supply means for said receptacle; load-reducing means operative to reduce the load in said receptacle before the final discharge thereof; driving means for successively advancing said receptacle; regulator mechanism; and means for regulating the operation of said driving means and thereby the advancing movements of said receptacle and partly controlled by said regulator mechanism on the operation thereof.

33. The combination with weighing mechanism embodying an advancing load-receiver, of stream-controlling means for regulating the supply of material to said receiver; regulator mechanism; load-reducing means operative to reduce the load preparatory to the final disposition thereof; driving means for advancing said load-receiver; and means partly controlled by said stream-controlling means and regulator mechanism for regulating the operation of said driving means, and thereby the advancing movement of said receiver.

34. The combination with weighing mechanism embodying an advancing load-receiver, of stream-controlling means for regulating the supply of material to said receiver; load-reducing means operative to reduce the load preparatory to the final disposition thereof; driving means for advancing said load-receiver; and means, partly controlled by said receiver and stream-controlling means, for regulating the operation of said driving means, and thereby the advancing movement of said load-receiver.

35. The combination, with a load-receptacle having successive advancing movements to receive and discharge a load, of load-supply means for said receptacle; supply-regulating valve mechanism and regulator mechanism; load-reducing means operative to reduce the load before the final discharge of the said load; driving means for advancing said receptacle; and means controlled by said load-receptacle, regulator and valve mechanisms, for regulating the operation of said driving means and thereby the advancing movement of said load-receptacle.

36. The combination, with a reciprocatory and rotary load-receptacle, of load-supply means for said receptacle; a supply-regulating valve and a regulator; driving means for rotating said receptacle; and means controlled by said load-receptacle, regulator, and valve, for regulating the operation of said driving means to permit said driving means to be thrown into action during a part of the reciprocatory movements of said receptacle, temporarily thrown out of action on the rotation thereof, again thrown into action on the operation of the regulator, and finally thrown out of action on the opening of the valve; and a load-reducing instrumentality operative to reduce the load within said receptacle before said driving means is first thrown into action and consequently before the rotation of said receptacle.

37. In a weighing-machine, the combination, with a rotatable load-receptacle having a mouth for both receiving and discharging the load, of load-supply means for said receptacle; driving means for rotating said receptacle; means controlled by a part of the weighing-machine, for regulating the operation of said driving means and operative to stop the receptacle when the mouth thereof has been carried into position approximately diametrically opposite to its load-receiving position; and load-reducing means operative to reduce the load within said receptacle at that period thereof intermediate the load-receiving and load-discharging positions of said receptacle.

38. In a weighing-machine, the combination, with a movable load-receptacle having successive overpoising and poising positions, of load-supply means therefor; rotary load-reducing means operative, when the receptacle is in its overpoise position, to reduce the load; driving means for actuating said receptacle into position on its return to its poise from its overpoise position, to thereby effect the discharge of the load; means for regulating the operation of said driving means and controlled by a part of the weighing-machine on the operation thereof.

39. In a weighing-machine, the combination, with a load-receptacle having successive advancing movements to receive and discharge the load, of load-supply means for said receptacle; rotary load-reducing means operative to reduce the load before the final discharge thereof; driving means for advancing said receptacle; means controlled by a part of the weighing-machine, for regulating the operation of said driving means and thereby the advancing movements of said receptacle.

40. In a weighing-machine, the combination of a rotary load-receptacle, driving means for rotating the same; overload-supply means for said receptacle; means controlled by a part of said weighing-machine, for regulating the operation of said driving means and thereby the rotation of said receptacle; and rotary load-reducing means operative to reduce the load in said receptacle before the final discharge thereof.

41. The combination, with a rotary load-receptacle, of driving means therefor; overload-supply means; valve mechanism for regulating such supply; regulator mechanism; means for regulating the operation of said driving means and thereby the rotation of said receptacle and controlled by the receptacle, valve, and regulator mechanisms on the operation thereof; and a continuously-operative, during a predetermined period, load-reducing instrumentality operative to reduce the load before the final discharge thereof.

42. The combination with a load-receiver having successive advancing movements to receive and discharge a load, of load-supply means therefor; positively-acting load-reducing means operative to reduce the load in said receiver preparatory to the final discharge thereof; and driving means for advancing said receiver, and including gear mechanism.

43. The combination with an upsettable load-receiver, of load-supply means therefor; a positively-acting load-reducing discharger operative to reduce the load in said receiver preparatory to the final discharge thereof; and means including gear mechanism for upsetting said receiver, thereby to discharge the load therefrom.

44. The combination with weighing mechanism embodying a load-receiver having successive advancing movements to receive and discharge a load, of load-reducing means therefor; regulator mechanism; driving means for advancing said receiver; and means for regulating the operation of said driving means, and thereby the advancing movement of said receiver, and partly controlled by said receiver and regulator mechanism on the operation thereof.

45. The combination, with a rotary load-receptacle, of load-supply means therefor; load-reducing means operative on the overpoising of said receptacle to reduce the load therein; and driving mechanism operative on the poising of said receptacle from its overpoising position to rotate the same, and comprehending gear mechanism, actuating means therefor; and a universally-jointed coupling connection intermediate said gear mechanism and actuating means.

46. A weighing-machine comprising a plurality of mechanisms including weighing mechanism operative to weigh a load, and embodying an advancing load-receiver; positively-acting load-reducing means therefor; driving means operative to advance said receiver; and means controlled by said mechanisms, one independently of the other, for regulating the operation of said driving means.

47. The combination, with a rotary load-receptacle, of the following instrumentalities: load-supply means; load-reducing means operative to reduce the load in said receptacle before a true load is obtained; driving means for actuating said load-reducing means; and driving means for rotating said receptacle into position, to thereby effect the discharge of the load.

48. The combination, with a rotary load-receptacle, of overload-supply means therefor; load-reducing means operative to reduce the load before a true load is obtained; actuating means therefor and embodying gear mechanism; and means for rotating said receptacle into position to effect the discharge of the load therefrom.

49. The combination, with a movable load-receptacle, of load-supply means therefor; a load-reducing device operative to discharge or feed the load from such receptacle before the final discharge thereof; actuating means therefor embodying peripherally-engaging gear mechanism; and means operative to move said receptacle into position to effect the discharge of the load therefrom.

50. The combination, with framework, of a movable load-receptacle supported thereby; load-supply means therefor; load-reducing means operative to reduce the load before the final discharge thereof; driving means for said load-reducing means, a part thereof carried by said framework and a part thereof movable with the receptacle and operative on the movement of said receptacle to engage and disengage that part thereof carried by said framework; and driving means operative to actuate said receptacle, to thereby effect the discharge of the load.

51. The combination, with framework, of a reciprocatory and rotary load-receptacle; overloading means therefor; load-reducing means carried by said receptacle and operative to reduce the load therein before the final discharge thereof; driving means carried by the framework and receptacle for actuating said load-reducing means during the descent and ascent of the receptacle; and driving means operative to rotate said receptacle into position to discharge the load therefrom.

52. The combination, with a load-receptacle having successive advancing movements to receive and discharge a load, of driving means for advancing said receptacle and embodying gear mechanism; load-supply means for said receptacle; load-reducing means operative to reduce the load within said receptacle before the final discharge thereof; and driving means therefor also embodying gear mechanism.

53. The combination, with weighing mechanism embodying a movable load-receptacle having overpoise and poise positions, of load-supply means therefor; load-reducing means operative to reduce the load within said receptacle before the final discharge thereof; driving means for said load-reducing means, and embodying gear mechanism thrown into operation on the overpoising of said receptacle to thereby actuate said load-reducing means; and driving mechanism for actuating said receptacle on its return to its poise from its overpoise position, to thereby effect the discharge of the load.

54. In a weighing-machine, the combination, with a rotary load-receptacle, of driving means therefor; load-supply means for said receptacle; load-reducing means; driving means for said load-reducing means; and means controlled by a part of the weighing-machine, for regulating the operation of the receptacle-driving means.

55. In a weighing-machine, the combination of a rotary load-receptacle, driving means therefor; means controlled by a part of the weighing-machine, for regulating the operation of said driving means and thereby the rotation of said receptacle; load-supply means for said receptacle; load-reducing means operative to reduce the load within said receptacle before the final disposition thereof; and driving mechanism therefor embodying gear mechanism and also controlled by a part of the weighing-machine.

56. The combination, with a rotary load-receptacle, of driving means therefor; load-supply means for said receptacle; valve mechanism for regulating the supply thereto; load-reducing means operative to reduce the load before the final discharge thereof; driving means for said load-reducing means; regulator mechanism; and means controlled by said receptacle, regulator, and valve mechanisms, for regulating the operation of the receptacle-driving means.

57. In a weighing-machine, the combination, with a load-receptacle having successive advancing movements to receive and discharge a load, of driving means therefor embodying gear mechanism; means controlled by a part of the weighing-machine, for regulating the operation of said driving means and thereby the advancing movements of said receptacle; load-supply means for said receptacle; load-reducing means operative to reduce the load in said receptacle before the final discharge thereof; and driving means therefor also embodying gear mechanism.

58. In a weighing-machine, the combination, with a rotary load-receptacle, of driving means for rotating said receptacle; load-supply means for said receptacle; means controlled by a part of said weighing-machine for regulating the operation of said driving means and thereby the rotation of said receptacle; rotary load-reducing means operative to reduce the load within said receptacle before the final discharge thereof; and driving means therefor and embodying gear mechanism.

59. The combination, with weighing mechanism embodying a rotary and reciprocatory load-receptacle, of driving means for rotating the same and embodying gear mechanism; load-supply means for said receptacle; valve mechanism; regulator mechanism; means controlled by said receptacle; regulator and valve mechanisms for regulating the operation of said driving means and thereby the rotation of said receptacle; a continuously-operative, load-reducing instrumentality comprehending a conveyer, feeder, or discharger and operative to reduce the load within said receptacle before the final discharge thereof; and driving means therefor embodying intermeshing gears, thrown into and out of operation on the reciprocation of said receptacle.

60. The combination with a load-receiver having successive advancing movements to receive and discharge a load, of load-supply means therefor; a positively-acting load-reducing device operative to reduce the load preparatory to the final discharge thereof; and reconveying means in position to receive the material acted on by the load-reducing means.

61. In a weighing-machine, the combination with weighing mechanism including an advancing load-receiver, of driving means therefor; means controlled by a part of the weighing mechanism for regulating the operation of said driving means; a load-reducing device operative to reduce the load preparatory to its final disposition; and driving means for said load-reducing means and also controlled in its operation by a part of the weighing mechanism.

62. The combination with weighing mechanism operative to weigh a load and embodying an advancing load-receiver having successive advancing movements to receive and discharge a load, of a positively-acting load-reducing device operative to reduce the load preparatory to the final disposition or discharge thereof.

63. In a rising-poise weighing-machine, the combination with a load-receiver having successive advancing movements to receive and discharge a load, of overload-supply means therefor; and a positively-acting load-reducing instrumentality operative, intermediate the advancing movements of said receiver, to reduce the load therein preparatory to the final discharge thereof.

64. The combination with a load-receiver having successive advancing movements alternating with successive positions of rest to thereby receive and discharge a load, of load-supply means therefor; and a positively-acting load-reducing device carried by the load-receiver and operative to reduce the load therein preparatory to the final discharge thereof.

65. The combination of weighing mechanism operative to weigh a load, and embodying a part having an advancing movement; and a positively-acting load-reducing device for reducing the load carried by said advancing part of the weighing mechanism preparatory to the final disposition or discharge of such load.

66. The combination with an upsettable load-receiver operative to effect the discharge of the load, of the following instrumentalities: load-supply means; and positively-acting load-reducing means operative to reduce the load preparatory to the final discharge thereof.

67. The combination with weighing mechanism embodying a rotary load-receiver, of load-supply means therefor; and a mechanically-operative device operative to force a part of the load from said receiver preparatory to the final disposition of said load.

68. The combination, with a rotary load-receptacle, of load-supply means therefor; and load-reducing means comprehending a propeller operative to project a part of said load from the receptacle before a true load is obtained.

69. The combination with weighing mechanism embodying a load-receiver having successive advancing movements to receive and discharge a load and also having a load-reducing period, of load-supply means therefor; and a load-reducing device continuously movable during the entire load-reducing period to reduce the load in said receiver preparatory to its final discharge.

70. The combination with an advancing load-receiver, of load-supply means therefor; and positively-acting load-reducing means operative simultaneously with or during a part of the supply of material to said receiver to reduce the load preparatory to the final disposition or discharge thereof.

71. In a rising-poise weighing-machine, the combination with a rotary load-receiver, of load-supply means therefor; and a force-feed load-reducing means operative to reduce the load in said receiver before or during the rotation of said receiver and preparatory to the final disposition or discharge of said load.

72. The combination, with a rotary load-receptacle, of overload-supply means therefor; and load-reducing means comprising a spiral conveyer operative to reduce said load before the final discharge thereof.

73. The combination, with a load-receptacle having successive advancing movements to receive and discharge a load, of a load-supply instrumentality therefor; and a rotary load-reducing instrumentality operative to reduce the load in said receptacle before the final discharge thereof.

74. The combination, with weighing mechanism embodying an upsettable load-receptacle, of the following instrumentalities: load-supply means; and rotary load-reducing means operative to reduce said load before the final discharge thereof.

75. The combination, with weighing mechanism embodying a load-receptacle having successive load-receiving, overload, poising, and load-discharging positions; of a load-supply instrumentality therefor; and a rotary load-reducing instrumentality operative to reduce the load within said receptacle before the final discharge thereof.

76. The combination, with framework, of a rotary load-receptacle journaled therein and having a load-reducing opening or outlet in one side thereof intermediate the top and bottom of said receptacle; a load-supply instrumentality for said receptacle; and a rotary load-reducing instrumentality supported by the journal of said receptacle and operative to reduce the load therein before the final discharge thereof.

77. The combination, with a load-receptacle having successive advancing movements to receive and discharge a load, of a load-supply instrumentality therefor; a load-reducing instrumentality operative to reduce the load therein before the final discharge thereof; and driving means for said load-reducing instrumentality.

78. The combination, with an upsettable load-receptacle, of a load-supply instrumentality; a load-reducing instrumentality operative to reduce the load therein before the final discharge thereof; and driving means for said load-reducing instrumentality.

79. The combination, with a rotary load-receptacle, of overload-supply means therefor; and load-reducing means carried within said receptacle for discharging a part of said load before the final discharge thereof and operative by means carried without said receptacle.

80. The combination, with a load-receptacle, of the following instrumentalities; load-supply means; load-reducing means operative to reduce the load before the final discharge thereof; and driving means for said load-reducing means and embodying peripherally-engaging gear mechanism.

81. In a weighing-machine the combination, with a load-receptacle, of the following instrumentalities: load-supply means; load-reducing means operative to reduce the load before the final discharge thereof; and driving mechanism therefor embodying intermeshing gears, the engagement thereof being controlled by and on the operation of a part of said weighing-machine.

82. The combination, with a load-receptacle, of the following instrumentalities: overload-supply means; load-reducing means operative to reduce the load before the final discharge thereof; and driving mechanism for said load-reducing means and embodying gear mechanism one part thereof carried by the receptacle.

83. The combination, with a movable load-receptacle, of load-supply means therefor; load-reducing means operative to reduce the load before the final discharge thereof; and driving means for said load-reducing means, and embodying peripherally-engaging gear mechanism operative on the movement of said receptacle.

84. In a weighing-machine the combination, with a load-receptacle having successive advancing movements to receive and discharge a load, of the following instrumentalities: load-supply means for said receptacle; load-reducing means operative to reduce the load therein before the final discharge thereof; and driving means for said load-reducing means and embodying gear mechanism, the engagement and disengagement thereof being controlled by and on the operation of a part of said weighing-machine.

85. In a weighing-machine the combination, with a rotary load-receptacle, of the following instrumentalities: load-supply means for said receptacle; load-reducing means operative to reduce the load before the final discharge thereof; and driving means for said load-reducing means and embodying gear mechanism, the engagement and disengagement thereof being controlled by and on the operation of a part of the weighing-machine.

86. The combination, with a reciprocatory load-receptacle, of the following instrumentalities: load-supply means for said receptacle; load-reducing means operative to reduce the load before the final discharge thereof; and driving means for said load-reducing means and embodying peripherally-engaging gears, the engagement and disengagement thereof being effected on the reciprocation of said receptacle.

87. The combination, with a reciprocatory and advancing load-receptacle, of the following instrumentalities: load-supply means for said receptacle; load-reducing means operative to reduce the load before the final discharge thereof; and driving means for said load-reducing means and embodying intermeshing gears, the engagement and disengagement thereof being effected on the reciprocation of said receptacle.

88. The combination, with a movable load-receptacle, of the following instrumentalities: load-supply means for said receptacle; load-reducing means operative to reduce the load before the final discharge thereof; and driving means for said load-reducing means and embodying gear mechanism, a part thereof movable with the receptacle and a part thereof non-movable relatively thereto and the engagement and disengagement thereof controlled by said receptacle during its operation.

89. The combination, with a load-receptacle, of load-supply means therefor; a rotary load-reducing instrumentality operable to reduce the load before the final discharge thereof; and driving means therefor and embodying peripherally-engaging gear mechanism.

90. The combination, with a load-receptacle having successive advancing movements to receive and discharge a load, of load-supply means therefor; a continuously-operative load-reducing instrumentality operative to reduce the load before the final discharge thereof; and driving means therefor embodying peripherally-engaging gear mechanism.

91. The combination, with a rotary load-receptacle, of overload-supply means therefor; rotary load-reducing means operative to reduce the load before the final discharge thereof; and driving means therefor and embodying a pair of gears one carried by the receptacle and the other non-movable relatively thereto.

92. The combination, with a reciprocatory and rotary load-receptacle, of overload-supply means therefor; a rotary load-reducing conveyer, feeder, or discharger operative to reduce the load before the final discharge thereof; and driving means therefor and embodying gear mechanism comprising a pair of gears one carried by and movable with the receptacle and the other non-movable relatively to said receptacle and adapted to be engaged by the receptacle-gear on the descent of said receptacle below its poising position.

93. The combination, with framework of a rotary and reciprocatory load-receptacle supported thereby, overload-supply means therefor; load-reducing means operative to reduce the load before the final discharge thereof; and driving means for said load-reducing means and embodying a pair of gears one carried by the framework and the other by the receptacle and movable therewith and adapted to engage said framework-gear on the descent of the receptacle.

94. In a weighing-machine the combination, with a load-receptacle having successive advancing movements to receive and discharge a load, of a load-supply instrumentality therefor; a load-reducing instrumentality operative to reduce the load in said receptacle before the final discharge thereof; and driving means for said load-reducing instrumentality, and controlled by a part of said machine.

95. The combination, with weighing mechanism embodying a rotary load-receptacle, of load-supply means therefor; and weighing-mechanism-controlled rotary load-reducing means operative to reduce the load in said receptacle before the final discharge thereof.

96. The combination, with a rotary load-receptacle, of overload-supply means therefor; a continuously-operative load-reducing means operative to reduce the load before the final discharge thereof; driving means for said load-reducing means and controlled in its operation by the load-receptacle.

97. The combination with framework, of hanger mechanism secured thereto for movement; counterbalanced beam mechanism for supporting said hanger mechanism; a load-receiver carried by the hanger mechanism; overload-supply means for said receiver; and positively-acting load-reducing means operative to reduce the load in said receiver preparatory to the final disposition thereof.

98. The combination with framework, of hanger mechanism movably secured thereto; counterbalanced beam mechanism supporting said hanger mechanism; a load-receiver supported by said hanger mechanism for successive advancing movements to receive and discharge a load; load-supply means therefor; and positively-acting load-reducing means operative to reduce the load preparatory to the final discharge thereof.

99. The combination with an advancing load-receiver, of load-supply means therefor; stream-controlling means operative to regulate such supply; and positively-acting load-reducing means operative to reduce the load in said receiver preparatory to the final disposition thereof.

100. The combination with a load-receiver having successive advancing movements to receive and discharge a load, of load-supply means therefor; stream-controlling means for regulating such supply, and directly controlled in its operation by said receiver; and a force-feed load-reducing device operative to reduce the load in said receiver preparatory to the final discharge thereof.

101. The combination, with weighing mechanism embodying a rotary load-receptacle, of load-supply means therefor; receptacle-controlled valve mechanism for regulating such supply; and rotary load-reducing means operative to reduce the load in said receptacle before the main discharge thereof.

102. The combination, with a rotary load-receptacle, of load-supply means therefor; an oscillatory valve operative to regulate such supply; rotary load-reducing means operative to reduce the load in said receptacle before the main discharge thereof; and driving means for rotating said receptacle into position to discharge the load therefrom.

103. The combination with a load-receiver having successive advancing movements to receive and discharge a load, of load-supply means therefor; stream-controlling means for regulating such supply; reciprocally-effective locking means for said stream-controlling means and load-receiver, and operative to lock the receiver against movement when the stream-controlling means is in operation, and to lock the stream-controlling means against movement during the advancing movement of said receiver; and load-reducing means operative to reduce the load in said receiver preparatory to the final discharge thereof.

104. The combination with weighing mechanism embodying a rotary load-receiver, of load-supply means therefor; receiver-controlled valve mechanism for regulating such supply; reciprocally-effective locking means for said valve and receiver; and load-reducing means operative to reduce the load in said receiver preparatory to the final disposition thereof.

105. The combination, with a load-receptacle having successive advancing movements to receive and discharge a load, of driving means for effecting the advance thereof; load-supply means for said receptacle; a valve operable to regulate such supply; locking means for said valve and receptacle and comprehending an oscillatory and a rotary locker reciprocally effective; and rotary load-reducing means operative to reduce the load in said receptacle before the main discharge thereof.

106. In a weighing-machine, the combination with a load-receiver, of load-supply means therefor; a positively-acting load-reducing device operative to reduce the load in said receiver preparatory to the final disposition of said load; and regulator mechanism operative by the discharging load to control the operation of a part of the weighing-machine.

107. In a weighing-machine, the combination with a load-receiver having successive rotary advancing movements to receive and discharge a load, of load-supply means therefor; load-reducing means operative to reduce the load therein preparatory to the final discharge thereof; and regulator mechanism operative by the discharging load to control the operation of a part of the weighing-machine.

108. The combination with weighing mechanism embodying an upsettable load-receiver, of load-supply means therefor; load-reducing means operative to reduce the load therein preparatory to the final disposition or discharge thereof; and regulator mechanism operative by the discharging load to control the operation of a part of the weighing-machine.

109. In a weighing-machine, the combination with a load-receiver, of load-supply means therefor; stream-controlling means for regulating such supply; positively-acting load-reducing means operative to reduce the load in said receiver preparatory to the final disposition thereof; and regulator mechanism operative by the discharging load to control the operation of a part of the weighing-machine.

110. The combination, with a load-receptacle having successive advancing movements to receive and discharge a load, of overload-supply means for said receptacle; load-reducing means operative to reduce the load therein before the final discharge thereof; driving means for advancing said receptacle; and means for regulating the operation of said receptacle-driving means, and comprehending shipper mechanism.

111. The combination, with a load-receptacle having successive advancing movements to receive and discharge a load, of load-supply means therefor; valve mechanism for regulating such supply; load-reducing means operative to reduce the load before the final discharge thereof; regulator mechanism; driving means for advancing said receptacle; and means for controlling the operation of said driving means, and comprehending shipper mechanism operative at one period by the valve mechanism, at another period by the regulator mechanism, and at other periods by the receptacle.

112. The combination, with a movable load-receptacle having an overpoise and a poise position during the weighing operation, of load-supply means therefor; valve mechanism for regulating such supply; reciprocally-effective valve-receptacle-locking means operative to lock the receptacle against movement other than to its overpoise position when the valve is open and to lock the valve closed during the movement of said receptacle other than to its poise position; load-reducing means operative when the receptacle is in its overpoise position to reduce the load therein; and driving means for actuating said receptacle into position on its return to its poise position from its overpoise position, to thereby effect the discharge of the load therefrom.

113. The combination, with a movable load-receptacle having an overpoising and poising position, of load-supply means therefor; valve mechanism for regulating such supply thereto; load-reducing means operative when the receptacle is in its overpoising position to reduce the load therein; regulator mechanism; driving means for actuating said receptacle into position on its return to its poise from its overpoise position, to thereby effect the discharge of the load; locking means operative to prevent the actuation of said receptacle by the driving means when the valve is open, and to prevent the opening of said valve during the actuation of said receptacle by said driving means; and means for regulating the operation of said driving means, and controlled through the medium of the receptacle, regulator, and valve mechanisms.

114. The combination with weighing mechanism including a load-receiver having successive advancing movements to receive and discharge a load; driving means for advancing said receiver; and means embodying automatically-operative shipper mechanism for regulating the operation of said driving means, thereby to alternately advance and stop said load-receiver a plurality of times during each rotation thereof.

115. The combination with a rotatable load-receiver having a mouth for both receiving and discharging a load, of driving means for rotating said receiver; means comprehending automatic shipper mechanism for regulating the operation of said driving means, and operative to stop the receiver when the mouth thereof has been carried into position approximately diametrically opposite to its load-receiving position, then operative to permit the advance of said receiver to its load receiving or starting position, and then operative to stop said receiver in such load-receiving position.

116. The combination of a movable load-receiver; driving means for moving said receiver; and means comprehending shipper mechanism for regulating the operation of said driving means, and partly controlled directly by said receiver.

117. The combination, with a reciprocatory and rotary load-receptacle, of driving means for rotating said receptacle; and means comprehending shipper mechanism for regulating the operation of said driving means and thereby the rotation of said receptacle, and partly controlled by the receptacle on its reciprocatory and rotary movements.

118. The combination with an axially-supported bucket having successive advancing movements on its axis to receive and discharge a load, of stream-controlling means for cutting off the supply of material to said bucket; driving means for advancing said bucket; and means for regulating the operation of said driving means and thereby the advancing movement of said receptacle, and partly controlled by said stream-controlling means on the operation thereof.

119. The combination with a load-receiver having successive advancing movements to receive and discharge a load, of regulator mechanism operative by the discharging load; driving means for advancing said receiver; and means for regulating the operation of said driving means and thereby the advancing movement of said receiver, and partly controlled by said regulator mechanism on the operation thereof.

120. The combination with a rotary load-receiver, of stream-controlling means for regulating the supply thereto; regulator mechanism; driving means for rotating said load-receiver; and means for regulating the operation of said driving means and thereby the rotation of said receiver, and partly controlled by said stream-controlling means and regulator mechanism on the operation thereof.

121. The combination with a rotary load-receiver, of stream-controlling means for regulating the supply thereto; driving means for rotating said receiver; and means for regulating the operation of said driving means and thereby the rotation of said receiver, and partly controlled by the stream-controlling means and load-receiver on the operation thereof.

122. The combination with a rotary load-receiver, of regulator mechanism; driving means for rotating said receiver; and means for regulating the operation of said driving means and thereby the rotation of said receiver, and partly controlled by said receiver and regulator mechanism on the operation thereof.

123. The combination with a rotary load-receiver, of load-supply means; stream-controlling mechanism; regulator mechanism; driving means for rotating said receiver; and means controlled through the medium of said receiver, regulator and stream-controlling mechanisms for regulating the operation of said driving means.

124. The combination, with a reciprocatory load-receptacle having successive advancing movements to receive and discharge a load, of supply-regulating valve mechanism and regulator mechanism; driving means for said receptacle; and means controlled through the medium of said receptacle, regulator, and valve mechanisms for regulating the operation of said driving means, whereby said driving means is thrown into action during a part of the reciprocatory movement of said receptacle, temporarily thrown out of action during a part of the advance thereof, again thrown into action on the operation of the regulator mechanism, and finally thrown out of action on the opening of the valve mechanism.

125. The combination, with a reciprocatory and rotary load-receptacle, of supply-regulating valve mechanism operable by the load-receptacle during a part of its reciprocatory and rotary movements; regulator mechanism; driving means for rotating said receptacle; and means controlled through the medium of said receptacle, regulator, and valve mechanisms for regulating the operation of said driving means and thereby the rotation of said receptacle, whereby said driving means is thrown into action during a part of the reciprocatory movement of said receptacle, temporarily thrown out of action during a part of the rotation thereof, again thrown into action on the operation of the regulator mechanism, and finally thrown out of action on the opening of the valve mechanism, through the medium of the load-receptacle.

126. The combination with stream-controlling means, of an advancing load-receiver; a shiftable member operative to engage said stream-controlling means; a device operative on the advancing movement of said receiver, first to directly engage said stream-controlling means and partly throw the same into operation and into position to be engaged by said shiftable member, and then to engage said shiftable member and thereby completely throw said stream-controlling means into operation.

127. The combination, with supply-regulating valve mechanism, of a load-receptacle having successive advancing movements to receive and discharge a load; and means for locking the valve open and comprising a shiftable member adapted to engage the valve, and a locker carried by the receptacle and adapted to engage said shiftable member to thereby lock the same against movement.

128. The combination, with supply-regulating valve mechanism, of a completely rotatable load-receptacle; and means for locking the valve open and comprising a cam-faced shiftable member operable to engage the valve, and a locker carried by the receptacle and adapted to engage said shiftable member to lock the same against movement.

129. The combination of supply-regulating valve mechanism; and a load-receptacle having successive advancing movements to receive and discharge a load and adapted positively to lock the valve open intermediate its advancing movements and permit the same to close at the proper predetermined period and also positively to open said valve during a part of its advancing movement.

130. The combination, with supply-regulating valve mechanism, of a completely rotatable load-receptacle adapted positively to lock the valve open and permit the same to close at the proper predetermined period and also positively to open said valve on its rotary movement; and driving mechanism operative to rotate said receptacle.

131. The combination with framework, of stream-controlling means; a load-receiver having successive advancing movements to receive and discharge a load; a shiftable member carried by said framework and operative to engage said stream-controlling means; and a device carried by said receiver and operative on the advancing movement thereof, first to engage said stream-controlling means and partly open the same and shift it into position to be engaged by said shiftable member, and then to engage said shiftable member, and thereby completely open said stream-controlling means.

132. The combination, with a load-receptacle having successive advancing movements to receive and discharge a load and with a supply-regulating valve therefor, of means operative to open and lock said valve open and comprising a shiftable member operative to engage said valve; and an actuator-locker operative on the advance of said receptacle first to engage the valve and partly open the same, and then to engage said shiftable member and completely and lock said valve open.

133. The combination, with a supply-regulating valve, of a rotary load-receptacle; means operative to open and to lock said valve open and comprising a shiftable member in position to engage the valve on the opening thereof and an actuator-locker, the latter operative to first engage the valve on the rotation of said receptacle to open the same and then to engage said shiftable member to thereby lock the same against movement and the valve open; and driving means for rotating said load-receptacle.

134. The combination, with framework, of a supply-regulating valve; a rotary load-receptacle; and means operative to open and to lock said valve open, and comprising a pair of arms carried by the valve; a shiftable cam-faced member carried by the framework and in position to engage one of said valve-arms; and a cam-faced actuator-locker carried by the receptacle and adapted, during a part of the rotation thereof, to engage one of said arms and open the valve, and then to engage said shiftable member and thereby lock the same against movement and the valve open.

135. The combination, with a reciprocatory load-receptacle and having successive advancing movements to receive and discharge a load and with a supply-regulating valve, of means operative to open and lock said valve open, and comprising a shiftable member operative to engage said valve at a predetermined period and an actuator-locker operative to engage said valve during a part of the advance of said receptacle to thereby open the same, and then to engage said shiftable member and lock the valve open, and also operative to release said shiftable member during a part of the reciprocatory movement of the receptacle and thereby permit the valve to close.

136. The combination, with framework of a load-receptacle having successive advancing movements to receive and discharge a load; supply-regulating valve mechanism therefor; and locking means partly carried by said framework and receptacle, and operative to lock the valve closed during the major part of the advancing movement of said receptacle.

137. The combination, with a load-receptacle having successive advancing movements to receive and discharge a load, of supply-regulating valve mechanism therefor; and reciprocally-effective locking means for said valve and receptacle.

138. The combination, with a supply-regulating valve mechanism and with a rotary load-receptacle, of driving means for said receptacle, and reciprocally-effective valve-receptacle-locking means operative to lock the receptacle against rotary movement when the valve is open, and to lock the valve closed during the major portion of the rotary movement of said receptacle.

139. The combination, with a load-receptacle having successive advancing movements to receive and discharge a load, of a supply-regulating valve therefor; and a valve-receptacle-locking means operable to lock the valve closed during the major part of the advance of said receptacle and to lock the receptacle against advance movement when the valve is open, and comprehending an oscillatory and a rotary locker reciprocally effective.

140. The combination, with a rotatable load-receptacle, of a supply-regulating valve therefor; and valve-receptacle-locking means operative to lock the receptacle against rotation when the valve is open, and to lock the valve closed during the major part of the rotation of said receptacle and comprising rotary means carried by the receptacle, and a member operatively connected with the valve and coacting with said rotary means.

141. The combination, with framework carrying a completely rotatable load-receptacle, of a supply-regulating valve therefor; and valve-receptacle-locking means operative to lock the receptacle against rotation when the valve is open, and to lock the valve closed during the major part of the rotation of said receptacle, and comprising an oscillatory locker carried by the framework and operatively connected with the valve for movement therewith, and a coacting locker carried by the load-receptacle.

142. The combination, with a load-receptacle having successive advancing movements to receive and discharge a load, of an oscillatory valve; valve-receptacle-locking means comprising an oscillatory locker operatively connected with said oscillatory valve for movement therewith, and a coacting locker comprehending a flange or rim carried by said receptacle for advance therewith.

143. The combination, with a rotary load-receptacle, of a supply-regulating valve therefor; locking means operative to lock the valve closed during the major part of the rotary movement of said receptacle, and to lock the receptacle against such movement while the valve is open, and comprising a shiftable member and a rotary member, the latter comprehending a circular flange or rim carried by said receptacle.

144. The combination, with a rotary load-receptacle, of a supply-regulating valve therefor; locking means operative to lock the valve closed during the major part of the rotary movement of said receptacle, and to lock said receptacle against such rotary movement when the valve is open, and comprising an oscillatory locker operatively connected with said valve for movement therewith; and a rotary locker comprehending a circular flange or rim carried by and movable with said receptacle and having an opening or cut-away part whereby the oscillatory locker will abut against the end of said flange and thereby lock the receptacle against rotation, and will have its end engaged by the inner face of the flange on the rotation of said receptacle to thereby lock the valve closed.

145. The combination, with framework, of a rotary load-receptacle supported thereby; an oscillatory supply-regulating valve therefor; and locking means operable to lock the receptacle against rotation when the valve is open, and to lock the valve closed during a major part of the rotation of said receptacle, and comprising a flanged oscillatory locker pivotally secured to said framework, a connector pivotally secured to said locker and valve whereby said locker is movable with the valve, and a rotary locker carried at one side of the receptacle and comprising a circular rim or flange having a relatively large diameter and an opening or cutaway portion and adapted to coact with said oscillatory locker.

146. The combination with a load-receiver having successive advancing movements to receive and discharge a load; stream-controlling means therefor; means for locking said stream-controlling means open; and independent means for locking said stream-controlling means closed, a part of each of said locking means being carried by said load-receiver.

147. The combination, with a load-receptacle having successive advancing movements to receive and discharge a load, of a supply-regulating valve therefor; means operative with the receptacle, during a part of its advance movement, to open said valve; and locking means operative to lock the valve closed during another part of the advancing movement of said receptacle, and to lock the receptacle against such advancing movement when the valve is open.

148. The combination, with a load-receptacle having successive advancing movements to receive and discharge a load, of a supply-regulating valve therefor; means operative to open said valve during one part of the advancing movement of said receptacle; means operative to lock said valve open; and means operative to lock the receptacle against advancing movement while the valve is open and to lock said valve closed during another part of the advancing movement of said receptacle.

149. The combination, with a reciprocatory and rotary load-receptacle, of a supply-regulating valve therefor; means operative to open said valve during a part of the rotation of said receptacle; means operative to lock said valve open and to also unlock said valve during a part of the reciprocatory movement of said receptacle and thereby permit the same to close; and means operative to lock the valve closed during the major part of the rotation of said receptacle and to lock the receptacle against rotary movement while said valve is open.

150. The combination, with a reciprocatory and rotary load-receptacle, of a supply-regulating valve therefor; means operative to open and to lock said valve open, and comprising a shiftable member operative to engage said valve, and an actuator-locker operative during a part of the rotation of said receptacle, first, to engage said valve and partly open the same, and then to engage said shiftable member and completely open and lock said valve open, and also operative to unlock said valve during a part of the reciprocatory movement of said receptacle to thereby permit the valve to close; and valve-receptacle-locking means operative, first, to lock the receptacle against rotary movement while the valve is open, and then to lock the valve closed during the major part of the rotation of said receptacle, and comprising an oscillatory locker operatively connected with the valve; and a rotary locker comprehending a circular flange or rim carried by said receptacle.

151. The combination with framework, of hanger mechanism pivotally secured to said framework; beam mechanism supporting said hanger mechanism; an advancing load-receiver supported by said hanger mechanism; and driving means for advancing said load-receiver and embodying gear mechanism carried by said receiver and hanger mechanism.

152. In a weighing-machine, the combination of a rotatable load-receiver; driving means therefor; and means comprehending counterweighted shipper mechanism for regulating the operation of said driving means and controlled by a part of the weighing-machine.

153. The combination, with a load-receptacle having successive advancing movements to receive and discharge a load, of supply-regulating valve mechanism and regulator mechanism; driving means for advancing said receptacle, and embodying a fast and loose pulley and a shiftable belt; and means for controlling the operation of said driving means and comprising shipper mechanism operatively connected with the valve and regulator mechanisms, for operation thereby and by the receptacle.

154. The combination, with a rotary load-receptacle, of supply-regulating valve mechanism therefor; regulator mechanism; driving means for rotating said receptacle into position to discharge a load, and embodying a fast and loose pulley and shiftable belt; means for controlling the operation of said driving means, and comprising counterweighted shipper mechanism operatively connected with the valve and regulator mechanisms and having means in position to be engaged by the receptacle, whereby said controlling means is operative on the operation of the receptacle, regulator, and valve mechanisms.

155. The combination, with a load-receptacle having successive advancing movements to receive and discharge a load and intermediate thereof successive overpoise and poise positions, of a supply-regulating valve therefor; a regulator; driving means for advancing said receptacle, and embodying a fast and a loose pulley and a shiftable belt; and means for controlling the operation of said driving means and comprehending shipper mechanism operatively connected with the valve and regulator, for operation by the same and by the receptacle, and operative to throw said driving mechanism into action as the receptacle moves to its poise position, to throw the same temporarily out of action on the advancing movement of said receptacle to its discharging position, to throw the same again into action on the operation of the regulator on its return to its normal position, and finally to throw the same out of action on the opening of the valve.

156. The combination, with a rotary and reciprocatory load-receptacle, of receptacle-controlled supply-regulating valve mechanism therefor; regulator mechanism; driving means for rotating said receptacle into position to discharge its load, and embodying a fast and a loose pulley and a shiftable belt; and means for controlling the operation of said driving means and comprehending counterweighted shipper mechanism operatively connected with the valve and regulator mechanisms, for operation by the same and by the receptacle, and operative to throw said driving mechanism into action on the ascent of said receptacle from an overpoise position, to throw the same out of action on the rotation of said receptacle to discharge the load, to throw the same into action on the operation of the regulator mechanism on the return thereof to its normal position, and finally to throw the same out of action on the opening of the valve effected by the receptacle as it is rotated into position to receive its load.

157. The combination, with a rotary and reciprocatory load-receptacle, of beam mechanism therefor; driving means for rotating said receptacle into position to discharge the load; and means for controlling said driving means, and comprehending shipper mechanism having a counterweighted actuator operatively connected with the beam mechanism, and a stop member; means for locking said counterweighted actuator against movement on the ascent of the counterweighted end thereof with the beam mechanism; means for unlocking the same on the ascent of the receptacle, to thereby permit the descent of the counterweighted end of said actuator and thereby the operation of the shipper mechanism, to throw the driving means into position to rotate said receptacle; and means carried by the receptacle, for engaging said stop member to thereby throw said driving means out of action on the rotation of said receptacle.

158. The combination, with weighing mechanism comprehending a rotary load-receptacle and beam mechanism supporting said receptacle, of supply-regulating valve mechanism; regulator mechanism; driving means for rotating said receptacle into position to discharge a load; and means for controlling said driving means, and comprehending shipper mechanism operatively connected with the valve and regulator mechanisms, and having a counterweighted actuator operatively connected with the beam mechanism, and a stop member; means for locking said actuator against movement; means carried by the receptacle for unlocking the same, to thereby permit the actuation of the shipper mechanism, through the medium of said weighted actuator, to throw the driving means into operation to thereby rotate the receptacle; means also carried by the receptacle, for engaging said stop member, and thereby again actuating the shipper mechanism to throw the driving means out of action and stop the rotation of the receptacle, said driving means being again thrown into and out of action by the regulator and valve mechanisms, respectively.

FRANCIS H. RICHARDS.

Witnesses:
FRED. J. DOLE,
HEATH SUTHERLAND.